United States Patent
Sun et al.

(10) Patent No.: US 11,647,124 B2
(45) Date of Patent: May 9, 2023

(54) METHOD, APPARATUS, AND SYSTEM FOR CONFIGURING POLICY FOR UE

(71) Applicant: HUAWEI TECHNOLOGIES CO., LTD., Guangdong (CN)

(72) Inventors: Haiyang Sun, Beijing (CN); Chunshan Xiong, Shenzhen (CN); Yizhuang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 16/928,241

(22) Filed: Jul. 14, 2020

(65) Prior Publication Data

US 2020/0344359 A1     Oct. 29, 2020

Related U.S. Application Data

(63) Continuation of application No. PCT/CN2019/071741, filed on Jan. 15, 2019.

(30) Foreign Application Priority Data

Jan. 15, 2018 (CN) .......................... 201810037562.1

(51) Int. Cl.
*H04W 4/00* (2018.01)
*H04M 15/00* (2006.01)
(Continued)

(52) U.S. Cl.
CPC ............. *H04M 15/66* (2013.01); *H04W 8/08* (2013.01); *H04W 48/16* (2013.01); *H04W 84/12* (2013.01)

(58) Field of Classification Search
CPC ........ H04M 15/66; H04W 8/08; H04W 48/16
(Continued)

(56) References Cited

U.S. PATENT DOCUMENTS

2013/0012260 A1* 1/2013 Salkintzis ............. H04W 48/08
455/550.1
2013/0028196 A1    1/2013 Zou et al.
(Continued)

FOREIGN PATENT DOCUMENTS

CN      102378148 A     3/2012
CN      106068016 A     11/2016
(Continued)

OTHER PUBLICATIONS

3GPP TS 23.501 V1.4.0 (Sep. 2017),3rd Generation Partnership Project; Technical Specification Group Services and System Aspects;System Architecture for the 5G System;Stage 2 (Release 15),total 152 pages.
(Continued)

*Primary Examiner* — Temica M Beamer
(74) *Attorney, Agent, or Firm* — Leydig, Voit & Mayer, Ltd.

(57) ABSTRACT

In a method for configuring a policy for user equipment (UE), a PCF network element receives policy information of the UE from a first network element. The policy information of the UE indicates a current policy of the UE. The PCF network element sends configuration information to the UE based on the policy information of the UE, and the configuration information instructs the UE to update the policy of the UE. The policy control function network apparatus then sends to the first network apparatus update information that comprises either the configuration information or an identifier of the configuration information.

23 Claims, 14 Drawing Sheets

(51) Int. Cl.
*H04W 8/08* (2009.01)
*H04W 48/16* (2009.01)
*H04W 84/12* (2009.01)

(58) Field of Classification Search
USPC ........................................................ 370/329
See application file for complete search history.

(56) References Cited

U.S. PATENT DOCUMENTS

| | | | | |
|---|---|---|---|---|
| 2014/0351880 | A1* | 11/2014 | Low | H04W 12/00 726/1 |
| 2016/0373935 | A1* | 12/2016 | Smith | H04M 15/60 |
| 2017/0019845 | A1 | 1/2017 | Nakahara | |
| 2019/0116520 | A1* | 4/2019 | Chaponniere | H04W 28/06 |
| 2019/0191467 | A1* | 6/2019 | Dao | H04W 76/10 |
| 2020/0053562 | A1* | 2/2020 | Kim | H04W 12/062 |
| 2021/0014780 | A1* | 1/2021 | Qiao | H04W 48/18 |

FOREIGN PATENT DOCUMENTS

| | | |
|---|---|---|
| EP | 1761093 A1 | 3/2007 |
| EP | 2437558 A1 | 4/2012 |
| WO | 2005122625 A1 | 12/2005 |
| WO | 2015145953 A1 | 10/2015 |

OTHER PUBLICATIONS

3GPP TS 23.502 V1.2.0 (Sep. 2017),3rd Generation Partnership Project;Technical Specification Group Services and System Aspects;Procedures for the 5G System;Stage 2 (Release 15),total 165 pages.

SA WG2, "Presentation of TS 23.502 "Procedures for the 5G System; Stage 2 (Release 15)" v2.0.0 for approval," [online], 3GPP TSG SA #78, Lisbon, Portugal, SP-170932, total 11 pages, 3rd Generation Partnership Project, Valbonne, France (Dec. 20-22, 2017).

Huawei, HiSilicon, "TS23. 502: Procedures for policy management when AMF relocation," [online], SA WG2 Meeting SA WG2 Meeting #124, Reno, Nevada, USA, S2-179633, total 6 pages, 3rd Generation Partnership Project, Valbonne, France (Nov. 27-Dec. 1, 2017).

Huawei, Hisilicon, "Update of solution #1.40," [online], 3GPP TSG SA WG3 (Security) Meeting #88, Dali, China, S3-171842, total 2 pages, 3rd Generation Partnership Project, Valbonne, France (Jul. 7-11, 2017).

Lenovo et al,"UE Policy configuration (23.503)",SA WG2 Meeting #123,S2-177244,Oct. 23-27, 2017, Ljubljana, Slovenia, total 7 pages.

3GPP TS 23.503 V15.0.0 (Dec. 2017),3rd Generation Partnership Project;Technical Specification Group Services and System Aspects;Policy and Charging Control Framework for the 5G System;Stage 2(Release 15), total 56 pages.

3GPP TS 23.502 V15.0.0 (Dec. 2017),3rd Generation Partnership Project;Technical Specification Group Services and System Aspects;Procedures for the 5G System;Stage 2(Release 15), total 257 pages.

Huawei et al,"TS 23.501 Decoupling policy control for Access Management and Session Management",SA WG2 Meeting #120,S2-172072, Mar. 27-31, 2017, Busan, South Korea, total 9 pages.

Ericsson,"23.502: UE Policies delivery. OI#7b and OI#7c",SA WG2 Meeting #124,S2-178332, Nov. 27-Dec. 1, 2017, Reno, Nevada (USA), total 20 pages.

* cited by examiner

METHOD, APPARATUS, AND SYSTEM FOR CONFIGURING POLICY FOR UE

CROSS-REFERENCE TO RELATED APPLICATIONS

This application is a continuation of International Application No. PCT/CN2019/071741, filed on Jan. 15, 2019, which claims priority to Chinese Patent Application No. 201810037562.1, filed on Jan. 15, 2018. The disclosures of the aforementioned applications are hereby incorporated by reference in their entirety.

TECHNICAL FIELD

This application relates to the field of communications technologies, and in particular, to a method, an apparatus, and a system for configuring a policy for user equipment (UE).

BACKGROUND

To address challenges brought by wireless broadband technologies and keep a leading position of a 3rd generation partnership project (3GPP) network, the 3GPP standard organization formulated a next generation mobile telecommunications system network architecture at the end of 2016, which is referred to as a 5th generation (5G) network architecture.

In a 5G network, a policy control function (PCF) network element is usually used to provide different policy control services for UE, to meet different service requirements of the UE. Specifically, the PCF network element may send a policy to the UE by using a non-access stratum (NAS) message. The policy includes an access network discovery and selection policy (ANDSP) and a user equipment route selection policy (URSP), which are respectively used to select an access mode and a packet data unit (PDU) session.

A size of the policy of the UE may be very large, but a length of the NAS message is limited. Therefore, the PCF network element may need to send the policy to the UE many times. The PCF network element may maintain a policy delivered by the PCF network element to the UE. However, in a process in which the UE moves in one public land mobile network (PLMN), the PCF network element may be changed. According to an existing standard, there is no interface between different PCF network elements in one PLMN. Therefore, a new PCF network element does not know whether a policy has been obtained by the UE, and usually needs to send all policies to the UE. This causes a waste of air interface resources.

SUMMARY

Embodiments of this application provide a method, an apparatus, and a system for configuring a policy for UE, to help save air interface resources.

According to a first aspect, an embodiment of this application provides a method for configuring a policy for UE. The method may include: receiving, by a PCF network element, policy information of the UE that is sent by a first network element, where the policy information of the UE is used to indicate a policy of the UE; and sending, by the PCF network element, configuration information to the UE based on at least the policy information of the UE, where the configuration information is used to indicate the UE to update the policy of the UE. Optionally, the first network element may be a UDR network element or an AMF network element. Optionally, the policy information of the UE is used to indicate a current policy of the UE, namely, a policy currently configured by a network side for the UE. The policy may include but is not limited to, for example, at least one of a URSP, an ANDSP, and a WLANSP. Certainly, this application is not limited thereto. In this technical solution, the PCF network element may obtain the policy information of the UE from the first network element, to send the configuration information to the UE based on at least the policy information of the UE, so that the PCF network element may no longer send the policy indicated in the policy information of the UE to the UE, thereby helping save air interface resources.

In a possible design, the sending, by the PCF network element, configuration information to the UE based on at least the policy information of the UE may include: if the configuration information includes first configuration information, sending, by the PCF network element, the first configuration information to the UE, where the first configuration information is used to indicate a first policy of the UE, and the policy indicated in the policy information of the UE does not include the first policy. Optionally, the first configuration information may include the first policy. In this possible design, the PCF network element may not deliver the policy indicated in the policy information of the UE to the UE. This may save air interface resources, compared with the prior art in which the PCF network element needs to deliver all policies to the UE.

In a possible design, the sending, by the PCF network element, configuration information to the UE based on at least the policy information of the UE may include: if the configuration information includes second configuration information, sending, by the PCF network element, the second configuration information to the UE, where the second configuration information is used to indicate the UE to delete a second policy, and the policy indicated in the policy information of the UE includes the second policy. Optionally, the second configuration information may include identification information of the second policy. This possible design provides a specific implementation in which the PCF network element manages the policy indicated in the policy information of the UE. Certainly, this application is not limited thereto.

In a possible design, the sending, by the PCF network element, configuration information to the UE based on at least the policy information of the UE may include: if the configuration information includes third configuration information, sending, by the PCF network element, the third configuration information to the UE, where the third configuration information is used to indicate the UE to update a third policy, and the policy indicated in the policy information of the UE includes the third policy. This possible design provides a specific implementation in which the PCF network element manages the policy indicated in the policy information of the UE. Certainly, this application is not limited thereto.

In a possible design, the method may further include: sending, by the PCF network element, update indication information to the first network element, where the update indication information includes at least one of the configuration information and a configuration information identifier, and the configuration information identifier is used to indicate the configuration information. For example, if the configuration information is the first configuration information, and the first configuration information includes the first policy, the update indication information may include identification information of the first policy. For another example, if the configuration information is the second configuration information, and the second configuration information includes the identification information of the second policy, the update indication information may include the identification information of the second policy, or the like. Another example is not enumerated. In this possible design, when the policy information of the UE is updated, the PCF network element synchronizes information about an updated policy to the first network element, to help a PCF network element that subsequently serves the UE to obtain latest policy information of the UE from the first network element, thereby helping save air interface resources.

In a possible design, the method may further include: receiving, by the PCF network element, policy storage status information sent by the UE, where the policy storage status information is used to indicate whether the UE stores a PCF policy; and sending, by the PCF network element, the PCF policy to the UE if the policy storage status information indicates that the UE does not store the PCF policy. This possible design may be applied to a scenario in which the PCF policy stored in the UE is lost, for example, a scenario in which a policy received before replacement of a SIM card of the UE is lost caused by the replacement of the SIM card. The PCF policy may be the policy indicated in the policy information of the UE.

In a possible design, the receiving, by the PCF network element, policy storage status information sent by the UE may include: receiving, by the PCF network element, a policy control obtaining request message sent by an AMF network element, where the policy control obtaining request message carries the policy storage status information, and the AMF network element sends the policy control obtaining request message to the PCF network element after receiving a registration request message sent by the UE. This possible design provides a manner in which the UE reports the policy storage status information. This application is not limited thereto.

According to a second aspect, an embodiment of this application provides a method for configuring a policy for UE. The method may include: sending, by a first network element, policy information of the UE to a PCF network element, to indicate the PCF network element to send configuration information to the UE based on at least the policy information, where the policy information is used to indicate a policy of the UE, and the configuration information is used to indicate the UE to update the policy of the UE.

In a possible design, the method may further include: receiving, by the first network element, update indication information sent by the PCF network element, where the update indication information includes at least one of the configuration information and a configuration information identifier, and the configuration information identifier is used to indicate the configuration information; and updating, by the first network element, the policy information of the UE based on the update indication information. For examples of the configuration information and the configuration information identifier, refer to the foregoing descriptions. Details are not described herein.

In a possible design, the first network element is a first AMF network element, and the method may further include: receiving, by the first AMF network element, the policy information sent by a second AMF network element, where the second AMF network element is an AMF network element to which the UE connects before the UE connects to the first AMF network element. This possible design provides a specific implementation in which the first AMF network element obtains the policy information. For example, the first AMF network element may be a new AMF network element in a registration procedure, and the second AMF network element may be an old AMF network element in the registration procedure. Alternatively, the first AMF network element may be a target AMF network element in an AMF network element switching procedure, and the second AMF network element may be a source AMF network element in the AMF network element switching procedure.

In a possible design, the receiving, by the first AMF network element, the policy information sent by a second AMF network element may include: receiving, by the first AMF network element, a first message sent by the second AMF network element, where the first message includes context information of the UE and the policy information of the UE. For example, when the method is applied to the registration procedure, the first message may be but is not limited to, for example, a context transfer response message. Certainly, this application is not limited thereto.

According to a third aspect, an embodiment of this application provides a method for configuring a policy for UE. The method may include: sending, by the UE, policy storage status information to a PCF network element, to indicate the PCF network element to send a PCF policy to the UE when the policy storage status information indicates that the UE does not store the PCF policy, where the policy storage status information is used to indicate whether the UE stores the PCF policy; and receiving, by the UE, the PCF policy sent by the PCF network element.

In a possible design, the sending, by the UE, policy storage status information to a PCF network element may include: sending, by the UE, a registration request message to an AMF network element, where the registration request message carries the policy storage status information, the registration request message is used to indicate the AMF network element to send a policy control obtaining request message to the PCF network element, and the policy control obtaining request message carries the policy storage status information.

In a possible design, the sending, by the UE, policy storage status information to a PCF network element may include: sending, by the UE, the policy storage status information to the PCF network element after receiving configuration information sent by the PCF network element, where the configuration information is configuration information sent by the PCF network element to the UE based on at least policy information of the UE, and the configuration information is used to indicate the UE to update a policy of the UE.

Based on any method provided in the second aspect and the third aspect, in a possible design, the first network element may be an AMF network element or a UDR network element. In another possible design, the policy information of the UE is used to indicate a current policy of the UE, namely, a policy currently configured by a network side for the UE. The policy may include but is not limited to, for example, at least one of a URSP, an ANDSP, and a WLANSP. Certainly, this application is not limited thereto.

According to a fourth aspect, an embodiment of this application provides a system for configuring a policy for UE. The system may include a PCF network element, a first network element, and the UE. The PCF network element may be configured to perform any possible design in the first aspect, the first network element may be configured to perform a corresponding method provided in the second aspect, and the UE may be configured to perform a corresponding method provided in the third aspect.

According to a fifth aspect, an embodiment of this application provides a PCF network element. The PCF network element may be configured to perform any possible design provided in the first aspect. The PCF network element may be specifically the PCF network element described in the first aspect.

In a possible design, the PCF network element may be divided into function modules based on the method provided in the first aspect. For example, each function module may be obtained through division for a corresponding function, or two or more functions may be integrated into one processing module.

In another possible design, the PCF network element may include a memory and a processor. The memory is configured to store a computer program, and when the computer program is executed by the processor, any possible design provided in the first aspect is performed.

According to a sixth aspect, an embodiment of this application provides a first network element. The first network element may be configured to perform any possible design provided in the second aspect. The first network element may be specifically the first network element described in the second aspect.

In a possible design, the first network element may be divided into function modules based on the method provided in the second aspect. For example, each function module may be obtained through division for a corresponding function, or two or more functions may be integrated into one processing module.

In another possible design, the first network element may include a memory and a processor. The memory is configured to store a computer program, and when the computer program is executed by the processor, any possible design provided in the second aspect is performed.

According to a seventh aspect, an embodiment of this application provides a terminal apparatus. The terminal apparatus may be configured to perform any possible design provided in the third aspect. The terminal apparatus may be specifically the UE described in the third aspect, or the terminal apparatus may be a chip.

In a possible design, the terminal apparatus may be divided into function modules based on the method provided in the third aspect. For example, each function module may be obtained through division for a corresponding function, or two or more functions may be integrated into one processing module.

In another possible design, the terminal apparatus may include a memory and a processor. The memory is configured to store a computer program, and when the computer program is executed by the processor, any possible design provided in the third aspect is performed.

An embodiment of this application further provides a processing apparatus, configured to implement a function of the foregoing apparatus (for example, the PCF network element, the first network element, or the terminal apparatus). The processing apparatus includes a processor and an interface. The processing apparatus may be a chip. The processor may be implemented by hardware, or may be implemented by software. When the processor is implemented by the hardware, the processor may be a logic circuit, an integrated circuit, or the like; when the processor is implemented by the software, the processor may be a general-purpose processor, and is implemented by reading software code stored in a memory. The memory may be integrated into the processor, or may be located outside the processor and exist independently.

An embodiment of this application further provides a computer readable storage medium. The computer readable storage medium stores a computer indication, and when the computer indication runs on a computer, the computer is enabled to perform any possible method in the first aspect to the third aspect.

An embodiment of this application further provides a computer program product. When the computer program product runs on a computer, any possible design provided in the first aspect to the third aspect is performed.

According to an eighth aspect, an embodiment of this application provides a method for determining a PCF network element. The method may include: sending, by a UDM network element, identification information of a first PCF network element to a first AMF network element, to indicate the first AMF network element to select the first PCF network element as a PCF network element that serves UE. The first PCF network element is a PCF network element selected by a second AMF network element to serve the UE. Optionally, the first AMF network element and the second AMF network element may be a same network element, or may be different network elements. This may help avoid a problem that because two AMF network elements that successively (or both) serve same UE select different PCF network elements or one AMF network element selects different PCF network elements at different moments, the two PCF network elements configure different policies for the UE, and consequently the UE does not know which policy is to be executed.

In a possible design, the method may further include: receiving, by the UDM network element, a query request message sent by the first AMF network element. In this case, the sending, by a UDM network element, identification information of a first PCF network element to a first AMF network element may include: sending, by the UDM network element, a query response message to the first AMF network element, where the query response message carries the identification information of the first PCF network element. This possible design provides an implementation scenario in which the UDM network element sends the identification information of the first PCF network element to the first AMF network element. Certainly, this application is not limited thereto. For example, when determining that the first AMF network element needs to execute a PCF network element selection procedure, the UDM network element sends the identification information of the first PCF network element to the first AMF network element. This application imposes no limitation to a specific implementation in which the UDM network element determines that the first AMF network element needs to execute the PCF network element selection procedure.

In a possible design, the method may further include: after receiving a query request message, sending, by the UDM network element, the query request message to the second AMF network element, to query the identification information of the first PCF network element. The UDM network element receives the identification information of the first PCF network element that is sent by the second AMF network element. This possible design provides an implementation in which the UDM network element obtains the identification information of the first PCF network element. Certainly, this application is not limited thereto.

In a possible design, the UDM network element may store identification information of a PCF network element selected by an AMF network element for the UE. The AMF network element may report the selected PCF network element to the UDM after executing a PCF network element selection procedure. In this case, after receiving a query request message, the UDM network element may query locally stored information, to send an identifier information of the first PCF network element to the first AMF network element. Based on this, optionally, the method may further include: receiving, by the UDM network element, identification information of a second PCF network element, where the second PCF network element is a PCF network element reselected by the first AMF network element to serve the UE. The UDM network element updates the identification information of the PCF network element selected by the first AMF network element to serve the UE from the identification information of the first PCF network element to the identification information of the second PCF network element. This helps a subsequent AMF network element to obtain latest identification information of a PCF network element that serves the UE from the UDM network element.

According to a ninth aspect, an embodiment of this application provides a method for determining a PCF network element. The method may include: receiving, by a first AMF network element, identification information of a first PCF network element that is sent by a UDM network element, and selecting the first PCF network element as a PCF network element that serves UE. The first PCF network element is an AMF network element selected by a second AMF network element to serve the UE. Optionally, the first AMF network element and the second AMF network element may be a same network element, or may be different network elements.

In a possible design, the method may further include: sending, by the first AMF network element, a query request message to the UDM network element, where the query request message is used to request the identification information of the first PCF network element. The receiving, by a first AMF network element, identification information of a first PCF network element that is sent by a UDM network element includes: receiving, by the first AMF network element, a query response message sent by the UDM network element, where the query response message carries the identification information of the first PCF network element.

In a possible design, the method may further include: reselecting, by the first AMF network element, a second PCF network element to serve the UE, and sending identification information of the second PCF network element to the UDM network element, to indicate the UDM network element to update the PCF network element selected by the first AMF network element to serve the UE.

According to a tenth aspect, an embodiment of this application provides a system for determining a PCF network element. The system may include a UDM network element, a first AMF network element, and a second AMF network element. The UDM network element may be configured to perform any method provided in the eighth aspect, and the first AMF network element may be configured to perform a corresponding method provided in the ninth aspect.

According to an eleventh aspect, an embodiment of this application provides a UDM network element. The UDM network element may be configured to perform any possible design provided in the eighth aspect. The UDM network element may be specifically the UDM network element described in the eighth aspect.

In a possible design, the UDM network element may be divided into function modules based on the method provided in the eighth aspect. For example, each function module may be obtained through division for a corresponding function, or two or more functions may be integrated into one processing module.

In another possible design, the UDM network element may include a memory and a processor. The memory is configured to store a computer program, and when the computer program is executed by the processor, any possible design provided in the eighth aspect is performed.

According to a twelfth aspect, an embodiment of this application provides an AMF network element. The AMF network element may be configured to perform any possible design provided in the ninth aspect. The AMF network element may be specifically the first AMF network element described in the ninth aspect.

In a possible design, the AMF network element may be divided into function modules based on the method provided in the ninth aspect. For example, each function module may be obtained through division for a corresponding function, or two or more functions may be integrated into one processing module.

In another possible design, the AMF network element may include a memory and a processor. The memory is configured to store a computer program, and when the computer program is executed by the processor, any possible design provided in the ninth aspect is performed.

An embodiment of this application further provides a processing apparatus, configured to implement a function of the foregoing apparatus (for example, the UDM network element provided in the eleventh aspect or the AMF network element provided in the twelfth aspect). The processing apparatus includes a processor and an interface. The processing apparatus may be a chip. The processor may be implemented by hardware, or may be implemented by software. When the processor is implemented by the hardware, the processor may be a logic circuit, an integrated circuit, or the like; when the processor is implemented by the software, the processor may be a general-purpose processor, and is implemented by reading software code stored in a memory. The memory may be integrated into the processor, or may be located outside the processor and exist independently.

An embodiment of this application further provides a computer readable storage medium. The computer readable storage medium stores a computer indication, and when the computer indication runs on a computer, the computer is enabled to perform any possible method in the eighth aspect and the ninth aspect.

An embodiment of this application further provides a computer program product. When the computer program product runs on a computer, any possible design provided in the eighth aspect and the ninth aspect is performed.

According to a thirteenth aspect, a chip system is provided. The chip system includes a processor, used by a communications apparatus to implement functions in the foregoing aspects, for example, generating, receiving, sending, or processing data and/or information in the foregoing methods. In a possible design, the chip system further includes a memory, and the memory is configured to store a program indication and data that are required by the communications apparatus. The chip system may include a chip, or may include a chip and another discrete device. The chip system may alternatively be an apparatus.

It may be understood that any apparatus, system, computer storage medium, or computer program product provided above is configured to perform a corresponding method provided above. Therefore, for advantageous effects that can be achieved by the any apparatus, system, computer storage medium, or computer program product, refer to advantageous effects in the corresponding method. Details are not described herein.

DESCRIPTION OF EMBODIMENTS

In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, the term "a plurality of" means two or more than two unless otherwise specified. In addition, to clearly describe technical solutions in embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and the terms such as "first" and "second" do not mean being definitely different either.

It should be noted that a network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

Figure 1:
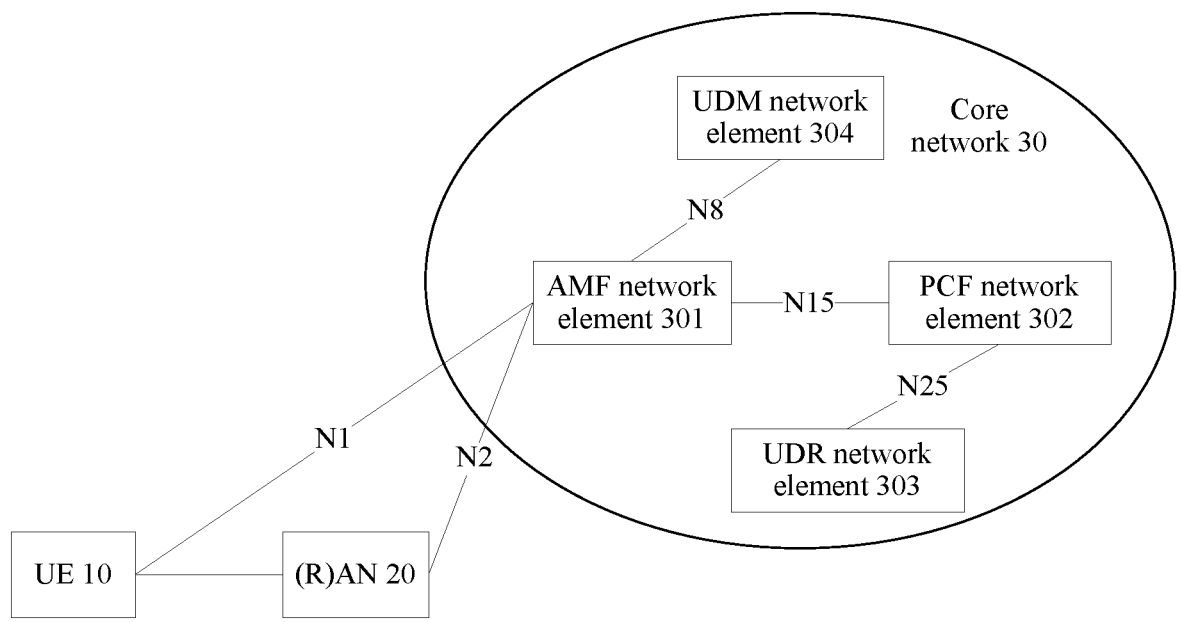
FIG. 1 is a schematic architecture diagram of a communications system to which a technical solution provided in an embodiment of this application is applicable.

The technical solutions provided in the embodiments of this application may be applied to a wireless communications system, and the wireless communications system may be a 5G system or another future communications system. Certainly, the wireless communications system may alternatively be a long term evolution (LTE) system, an LTE-advanced (LTE-A) system, or the like. That the wireless communications system is a 5G system is used as an example. FIG. 1 is a schematic architecture diagram of a communications system to which a technical solution provided in an embodiment of this application is applicable. In FIG. 1, the communications system may include UE 10, a radio access network (RAN) or access network (AN) 20 (referred to as a (R)AN 20 below), and a core network 30. The core network 30 includes an access and mobility management function (AMF) network element 301, a PCF network element 302, a unified data repository (UDR) network element 303, a unified data management (UDM) network element 304, and the like. The UE 10 communicates with the AMF network element 301 by using a next generation network interface 1 (N1 for short). The (R)AN 20 is specifically a network element in the (R)AN 20, and communicates with the AMF network element 301 by using an N2 interface (N2 for short). The AMF network element 301 communicates with the PCF network element 302 by using an N15 interface (N15 for short). The PCF network element 302 communicates with the UDR network element 303 by using an N25 interface (N25 for short). The AMF network element 301 communicates with the UDM network element 304 by using an N8 interface (N8 for short). A connection between the foregoing network elements may be a wireless connection or a wired connection. A solid line is used in FIG. 1 to conveniently and intuitively represent a connection relationship between the network elements.

The UE 10 is a terminal, may include various handheld devices, vehicle-mounted devices, wearable devices, or computing devices that have a wireless communication function, or another processing device connected to a wireless modem, and may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, relay user equipment, or the like. The relay user equipment may be, for example, a 5G residential gateway (RG). For ease of description, these terminals are collectively referred to as UE in this application.

The (R)AN 20 is used by the UE 10 to access a network. The network element in the (R)AN 20 may include but is not limited to, for example, a base station, an evolved NodeB (eNB), a next generation NodeB (gNB), a new radio eNB, a macro base station, a micro base station, a high frequency base station or transmission and reception point (TRP), a non-3GPP access network (Wi-Fi), and/or a non-3GPP interworking function (N3IWF) device.

The AMF network element 301 is used for connection management, mobility management, registration management, access authentication and authorization, accessibility management, security context management, and the like. Usually, one AMF network element 301 serves one UE 10. Optionally, in a roaming scenario, two AMF network elements 301 may both serve one UE 10. As a position of the UE 10 changes, an AMF network element 301 that serves the UE 10 may be changed. Specifically, the (R)AN 20 may execute a procedure of selecting the AMF network element 301. In addition, in some embodiments provided in this application, the AMF network element 301 may store policy information of the UE 10, for example, store a policy currently configured for the UE 10. Optionally, the AMF network element 301 may further store a policy that currently needs to be configured but is not configured for the UE 10, and the like. The policy information of the UE 10 that is stored in the AMF network element 301 may be updated as a policy configured by a network side for the UE 10 is updated. For a specific example, refer to the following descriptions. The policy configured by the network side for the UE 10 may include a policy configured by a PCF network element 302 (including a PCF network element that previously serves the UE 10 and a PCF network element 302 that currently serves the UE 10) on the network side for the UE 10. The policy information of the UE 10 may be used to indicate a policy of the UE 10, for example, at least one of an ANDSP, a URSP, and a wireless local area network selection policy (WLANSP). Certainly, the policy of the UE 10 may alternatively be another policy, and is not limited in this application.

The PCF network element 302 is configured to formulate a policy, provide a policy control service, and obtain subscription information related to policy decision, and the like. A policy that is determined by the PCF network element 302 and that needs to be configured for the UE 10 may be updated. For example, based on a change of the position of the UE 10, a change of subscription information of the UE 10, or the like, the PCF network element 302 updates the policy that needs to be configured for the UE 10. For example, at a moment, based on a current position of UE 10, subscription information of the UE 10, and the like, the PCF network element 302 determines that policies that need to be configured for the UE 10 are policies 1 to 10; at another moment, because the subscription information of the UE 10 changes, policies that are determined by the PCF network element 302 and that need to be configured for the UE 10 are policies 5 to 11. The PCF network element 302 may configure a policy for the UE 10 many times, and store information about the policy configured by the PCF network element 302 for the UE 10. For example, assuming that at a moment, policies that are determined by the PCF network element 302 and that need to be configured for the UE 10 are policies 1 to 10, the PCF network element 302 may send policies 1 to 3 to the UE 10 for the first time, and send policies 4 to 10 to the UE for the second time. In addition, due to a cause such as the change of the position of the UE 10, a PCF network element 302 that provides a policy control service for the UE 10 may also be changed. Specifically, the AMF network element 301 may execute a procedure of selecting the PCF network element.

The UDR network element 303 is configured to provide subscription data for the UDM network element 304 or obtain subscription data from the UDM network element 304; provide policy data for the PCF network element 302 or obtain policy data from the PCF network element 302, and the like. In addition, in some embodiments provided in this application, the UDR network element 303 may store the policy information of the UE 10.

The UDM network element 304 is configured to: process authentication information in a 3GPP authentication and key agreement mechanism, process user identity information, and perform access authorization, registration and mobility management, subscription management, SMS message management, and the like.

Although not shown, the 5G network may further include other network elements, such as a user plane function (UPF) network element, an authentication server function (AUSF) network element, an application function (AF) network element, a network exposure function (NEF) network element, and a network slice selection function (NSSF) network element. This is not specifically limited in the embodiments of this application.

It should be noted that a name of an interface between the network elements in FIG. 1 is merely an example, and in specific implementation, the interface name may be another name. This is not specifically limited in the embodiments of this application.

It should be noted that the AMF network element 301, the PCF network element 302, the UDR network element 303, the UDM network element 304, and the like in FIG. 1 are merely names, and the names constitute no limitation on the devices. In the 5G network and another future network, network elements or entities corresponding to the AMF network element 301, the PCF network element 302, the UDR network element 303, and the UDM network element 304 may alternatively use other names. This is not specifically limited in the embodiments of this application. For example, the AMF network element 301 may be replaced with an AMF 301. This is uniformly described herein, and not described again below.

Optionally, the network elements (for example, the UE 10, the AMF network element 301, the PCF network element 302, the UDR network element 303, and the UDM network element 304) in FIG. 1 may be implemented by one device, or may be jointly implemented by a plurality of devices, or may be implemented by a function module in a device. This is not specifically limited in the embodiments of this application. It may be understood that the function may be a network component in a hardware device, or may be a software function running on dedicated hardware or a virtualization function instantiated on a platform (for example, a cloud platform).

Figure 2:
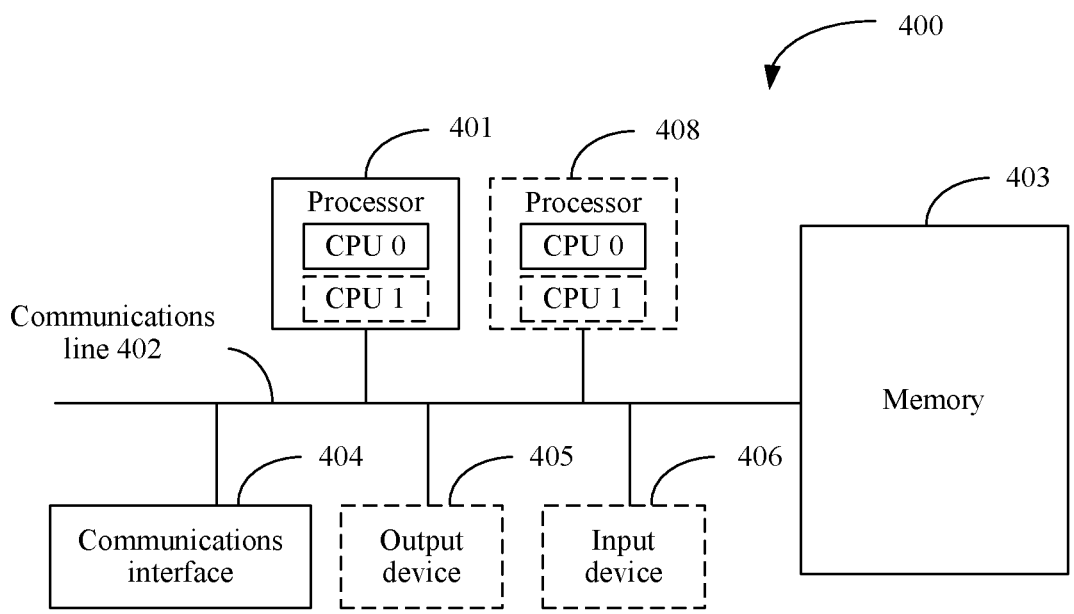
FIG. 2 is a schematic structural diagram of a communications device according to an embodiment of this application.

For example, each network element in FIG. 1 may be implemented by a communications device in FIG. 2. FIG. 2 is a schematic structural diagram of hardware of a communications device according to an embodiment of this application. The communications device 400 includes at least one processor 401, a communications line 402, a memory 403, and at least one communications interface 404.

The processor 401 may be a general-purpose central processing unit (CPU), a microprocessor, an application-specific integrated circuit (ASIC), or one or more integrated circuits configured to control program execution of the solutions in this application.

The communications line 402 may include a path for transmitting information between the foregoing components.

The communications interface 404 uses any apparatus such as a transceiver, and is configured to communicate with another device or a communications network, such as Ethernet, a RAN, or a wireless local area network (WLAN).

The memory 403 may be a read-only memory (ROM) or another type of static storage device capable of storing static information and indications, a random access memory (RAM) or another type of dynamic storage device capable of storing information and indications, or may be an electrically erasable programmable read-only memory (EEPROM), a compact disc read-only memory (CD-ROM), or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of indications or data structures and capable of being accessed by a computer, but is not limited thereto. The memory may exist independently, and is connected to the processor by using the communications line 402. The memory may be alternatively integrated with the processor.

The memory 403 is configured to store a computer executable indication used to execute the solution of this application, and the computer executable indication is controlled and executed the processor 401. The processor 401 is configured to execute the computer executable indication stored in the memory 403, to implement a method provided in the following embodiment of this application.

Optionally, the computer executable indication in this embodiment of this application may also be referred to as application program code. This is not specifically limited in this embodiment of this application.

In specific implementation, in an embodiment, the processor 401 may include one or more CPUs, for example, a CPU 0 and a CPU 1 in FIG. 2.

In specific implementation, in an embodiment, the communications device 400 may include a plurality of processors, for example, the processor 401 and a processor 408 in FIG. 2. Each of these processors may be a single-core processor, or may be a multi-core processor. The processor herein may be one or more devices, circuits, and/or processing cores configured to process data (for example, a computer program indication).

In specific implementation, in an embodiment, the communications device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector. The input device 406 communicates with the processor 401, and may receive user input in a plurality of manners. For example, the input device 406 may be a mouse, a keyboard, a touchscreen device, or a sensing device.

The communications device 400 may be a general-purpose device or a dedicated device. In specific implementation, the communications device 400 may be a desktop computer, a portable computer, a network server, a personal digital assistant (PDA), a mobile phone, a tablet computer, a wireless terminal device, an embedded device, or a device with a structure similar to that in FIG. 2. A type of the communications device 400 is not limited in this embodiment of this application.

With reference to FIG. 1 and FIG. 2, the following describes a method for configuring a policy for UE provided in this application. It should be noted that in the following embodiments of this application, a name of a message or a name of each parameter in a message transmitted between network elements is merely an example, and another name may be alternatively used in specific implementation. This is uniformly described herein, and is not specifically limited in the embodiments of this application.

Figure 3:
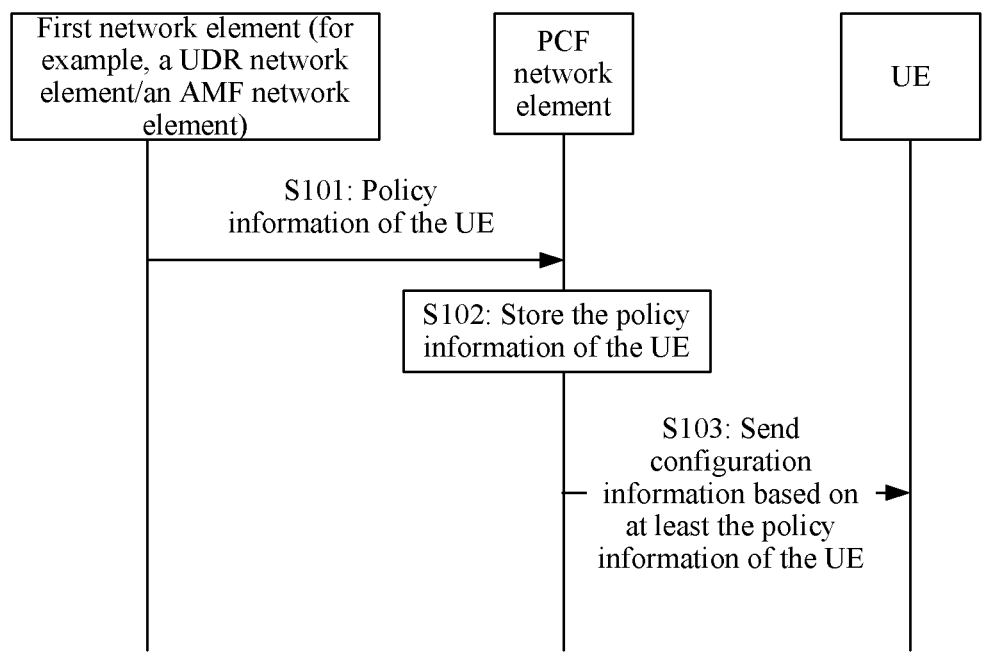
FIG. 3 is a schematic flowchart 1 of a method for configuring a policy for UE according to an embodiment of this application.

FIG. 3 shows a method for configuring a policy for UE according to an embodiment of this application. The method may be applied to the communications system shown in FIG. 1. The method includes the following steps.

S101: A first network element sends policy information (for example, UE policy storage status information) of the UE to a PCF network element, and the PCF network element receives the policy information of the UE. The policy information of the UE is used to indicate a policy of the UE. The first network element may be a UDR network element or an AMF network element.

The method for configuring a policy for UE provided in this embodiment may be applied to, but not limited to, a registration procedure or a PCF network element switching procedure. The PCF network element switching procedure includes a PCF network element switching procedure executed when the AMF network element is not switched, and a PCF network element switching procedure executed when the AMF network element is switched.

This application imposes no limitation to a trigger condition in which the first network element performs S101. For example, if the first network element is the UDR network element, the UDR network element may send the policy information of the UE to the PCF network element when receiving a request message (for example, a policy control obtaining request message) sent by the PCF network element. If the first network element is the AMF network element, the AMF network element may send the policy information of the UE to a selected PCF network element after executing a PCF network element selection procedure. This application is not limited thereto.

The PCF network element may serve one or more UEs, and the UE in S101 may be any UE served by the PCF network element. The PCF network element that serves any UE may be changed. The policy information of the UE is used to indicate a current policy of the UE, namely, a policy currently configured by a network side for the UE. For example, the policy may include a policy or a plurality of policies configured for the UE by one or more PCF network elements (including the PCF network element in S101 and another PCF network element) that serve (including that previously serve or that are serving) the UE.

In this application, the first network element may store the policy information of the UE. The policy information of the UE that is stored in the first network element may be synchronized to the first network element when the PCF network element sends configuration information to the UE. Certainly, this application is not limited thereto. For a specific implementation in which the PCF network element synchronizes the policy information of the UE to the first network element, refer to the following descriptions, for example, refer to FIG. 4 to FIG. 6 below. This application imposes no limitation to a specific mode of the policy information of the UE. Some possible modes are listed below.

Mode 1: The policy information of the UE may be specifically represented as a correspondence between identification information of the UE and identification information of the policy configured by the network side for the UE. For example, it is assumed that at a current moment, policies that need to be configured by the network side for UE 1 are policies 1 to 3, policies that need to be configured by the network side for UE 2 are policies 1 to 4, and policies that need to be configured by the network side for UE 3 are policies 3 and 4. Currently, a policy configured by the network side for the UE 1 is the policy 1, policies configured by the network side for the UE 2 are policies 1 and 2, and policies configured by the network side for the UE 3 are the policies 3 and 4. In this case, the policy information of the UE that is stored in the first network element may be shown in Table 1.

TABLE 1

| Identification information of the UE | Identification information of the policy configured by the network side for the UE |
| --- | --- |
| Identification information of the UE 1 | Identification information of the policy 1 |
| Identification information of the UE 2 | Identification information of the policy 1, and identification information of the policy 2 |
| Identification information of the UE 3 | Identification information of the policy 3, and identification information of the policy 4 |

Mode 2: The policy information of the UE may be specifically represented as a correspondence among identification information of the UE, identification information of a policy that needs to be configured by the network side for the UE, and whether each policy that needs to be configured by the network side for the UE is in a configured state. For example, a binary number "1" may be used to indicate being in the configured state, and a binary number "0" may be used to indicate being in an unconfigured state. For example, based on the example shown in Table 1, in this mode, the policy information of the UE that is stored in the first network element may be shown in Table 2.

TABLE 2

| Identification information of the UE | Identification information of the policy that needs to be configured by the network side for the UE | Whether being in the configured state |
| --- | --- | --- |
| Identification information of the UE 1 | Identification information of the policy 1 | 1 |
| | Identification information of the policy 2 | 0 |
| | Identification information of the policy 3 | 0 |
| Identification information of the UE 2 | Identification information of the policy 1 | 1 |
| | Identification information of the policy 2 | 1 |
| | Identification information of the policy 3 | 0 |
| | Identification information of the policy 4 | 0 |
| Identification information of the UE 3 | Identification information of the policy 3 | 1 |
| | Identification information of the policy 4 | 1 |

Mode 3: The policy information of the UE may be specifically represented as a correspondence between identification information of the UE and content of the policy configured by the network side for the UE. For example, based on the example shown in Table 1, in this mode, the policy information of the UE that is stored in the first network element may be shown in Table 3.

TABLE 3

| Identification information of the UE | Content of the policy configured by the network side for the UE |
| --- | --- |
| Identification information of the UE 1 | Content of the policy 1 |
| Identification information of the UE 2 | Content of the policy 1, and content of the policy 2 |
| Identification information of the UE 3 | Content of the policy 3, and content of the policy 4 |

Mode 4: The policy information of the UE may be specifically represented as a correspondence among identification information of the UE, content of a policy that needs to be configured by the network side for the UE, and whether each policy that needs to be configured by the network side for the UE is in a configured state. For example, a binary number "1" may be used to indicate being in the configured state, and a binary number "0" may be used to indicate being in an unconfigured state. For example, based on the example shown in Table 1, in this mode, the policy information of the UE that is stored in the first network element may be shown in Table 4.

TABLE 4

| Identification information of the UE | Content of the policy that needs to be configured by the network side for the UE | Whether being in the configured state |
| --- | --- | --- |
| Identification information of the UE 1 | Content of the policy 1 | 1 |
| | Content of the policy 2 | 0 |
| | Content of the policy 3 | 0 |
| Identification information of the UE 2 | Content of the policy 1 | 1 |
| | Content of the policy 2 | 1 |
| | Content of the policy 3 | 0 |
| | Content of the policy 4 | 0 |
| Identification information of the UE 3 | Content of the policy 3 | 1 |
| | Content of the policy 4 | 1 |

For example, it is assumed that the UE in S101 is the UE 2. In this case, if the policy information of the UE is shown in Table 1, the policy information of the UE may be specifically the identification information of the policy 1 and the identification information of the policy 2. If the policy information of the UE is shown in Table 2, the policy information of the UE may be specifically the identification information of the policies 1 and 2 and a state "11", where the state "11" indicates that the policies 1 and 2 are configured; or the policy information of the UE may be specifically the identification information of the policies 1 to 4 and a state "1100", where the state "1100" indicates that the policies 1 and 2 are configured and the policies 3 and 4 are not configured. If the policy information of the UE is shown in Table 3, the policy information of the UE may be specifically the content of the policy 1 and the content of the policy 2. If the policy information of the UE is shown in Table 4, the policy information of the UE may be specifically the content of the policies 1 and 2 and a state "11", where the state "11" indicates that the policies 1 and 2 are configured; or the policy information of the UE may be specifically the content of the policies 1 to 4 and a state "1100", where the state "1100" indicates that the policies 1 and 2 are configured and the policies 3 and 4 are not configured.

It should be noted that the policy information of the UE that is sent by the first network element to the PCF network element may be some or all of the policy information of the UE that is stored in the first network element. For example, it is assumed that the UE in S101 is the UE 2. In this case, if the policy information of the UE is shown in Table 1, the policy information of the UE may be specifically the identification information of the policy 1. Another example is not enumerated.

It may be understood that Table 1 to Table 4 are examples of the policy information of the UE that is stored in the first network element, and constitute no limitation on the policy information of the UE that is stored in the first network element.

It should be noted that if the first network element is the AMF network element, the AMF network element may be an AMF network element (for example, a new AMF network element in FIG. 9 or a target AMF network element in FIG. 10) that serves the UE currently (namely, at a moment when S101 is performed). If the AMF network element is not an AMF network element that first serves the UE, the AMF network element may send the policy information of the UE to the PCF network element after receiving policy information of the UE that is sent by an AMF network element (for example, an old AMF network element in FIG. 9 or a source AMF network element in FIG. 10) that serves the UE before the current moment.

S102: The PCF network element stores the policy information of the UE.

Subsequently, this application imposes no limitation to how the PCF network element uses the stored policy information of the UE. For example, the PCF network element may manage, in a manner of managing a policy configured by the PCF network element for the UE, the policy indicated in the policy information of the UE. For example, S103 may be performed.

S103: The PCF network element sends configuration information to the UE based on at least the policy information of the UE. For example, the PCF network element may send the configuration information to the UE based on the policy information of the UE and at least one of a change of a position of the UE and a change of subscription information of the UE.

Specifically, that the PCF network element sends configuration information to the UE may include at least one of the following cases: ① The PCF network element delivers one or more new policies to the UE. ② The PCF network element indicates the UE to delete one or more policies indicated in the policy information of the UE in S101. ③ The PCF network element indicates the UE to modify content of one or more policies indicated in the policy information of the UE in S101.

Optionally, based on either of the mode 1 and the mode 2, when performing the case ① or ②, the PCF network element updates the identification information of the policy configured by the network side for the UE, that is, updates the policy information of the UE. Therefore, the PCF network element may synchronize identification information of an updated policy to the first network element, to help a PCF network element that subsequently serves the UE to obtain latest policy information of the UE from the first network element. Based on either of the mode 3 and the mode 4, when performing the case ①, ②, or ③, the PCF network element updates the policy configured by the network side for the UE. Therefore, the PCF network element may synchronize an updated policy to the first network element, to help a PCF network element that subsequently serves the UE to obtain latest policy information of the UE from the first network element.

An example in which the policy information of the UE is the policy information described in the mode 1 or the mode 2 is used below for description. In addition, the case ① is described with reference to FIG. 4, the case ② is described with reference to FIG. 5, and the case ③ is described with reference to FIG. 6.

Figure 4:
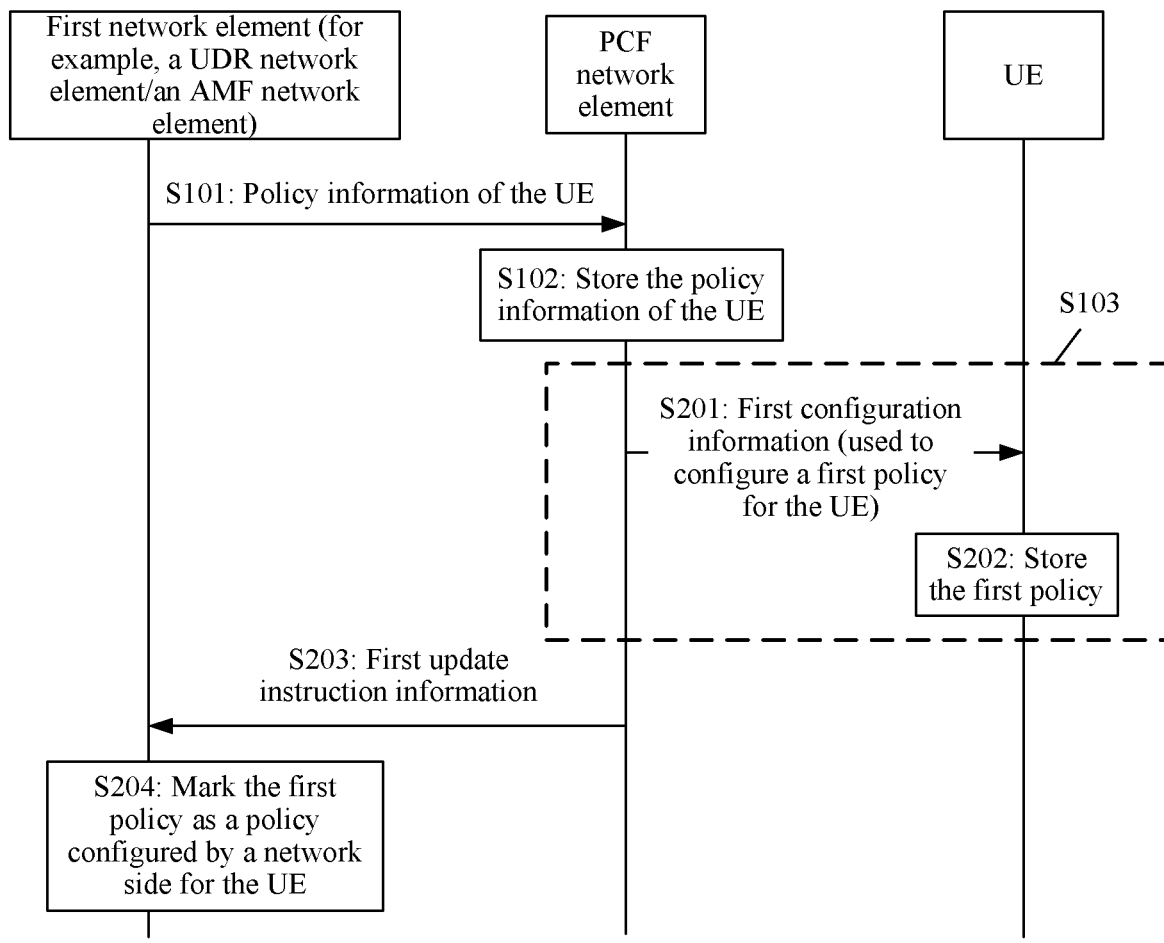
FIG. 4 is a schematic flowchart 2 of a method for configuring a policy for UE according to an embodiment of this application.

FIG. 4 is a flowchart of a method for configuring a policy for UE according to an embodiment of this application. The method may include the following steps.

S201: A PCF network element sends first configuration information to the UE, and the UE receives the first configuration information. The first configuration information is used to configure a first policy for the UE, and the policy indicated in the policy information of the UE in S101 does not include the first policy.

The first configuration information may carry content of the first policy. Optionally, the first configuration information may further carry identification information of the first policy.

Specifically, the PCF network element may determine, based on information such as a change of a position of the UE and a change of subscription information of the UE, that a new policy needs to be delivered to the UE, and therefore perform S201. The new policy is a policy other than the policy indicated in the policy information of the UE in S101. The PCF network element may send the first configuration information to the UE through an AMF network element.

S202: The UE stores the first policy after receiving the first configuration information.

Subsequently, the UE may perform, based on the first policy, an operation corresponding to the first policy. For example, assuming that the first policy is an ANDSP, the UE may perform network access based on an access mode indicated in the first policy.

S203: The PCF network element sends first update indication information to a first network element, and the first network element receives the first update indication information. The first update indication information is used to indicate the first network element to update policy information of the UE that is stored in the first network element, and specifically to mark the first policy as a policy configured by a network side for the UE.

The first update indication information may carry the identification information of the first policy.

S204: Based on the first update indication information, the first network element marks the first policy as the policy configured by the network side for the UE.

For example, referring to Table 1, if the UE is the UE 2, the policy indicated in the policy information of the UE in S101 may be the policy 1 and the policy 2. That is, policies configured by the network side for the UE are the policy 1 and the policy 2. In this embodiment, the first policy may be the policy 3 or the policy 4. If the first policy is the policy 3, after S204 is performed, policy information of each UE that is stored in the first network element may be shown in Table 5.

TABLE 5

| Identification information of the UE | Identification information of the policy configured by the network side for the UE |
| --- | --- |
| Identification information of the UE 1 | Identification information of the policy 1 |
| Identification information of the UE 2 | Identification information of the policy 1, identification information of the policy 2, and identification information of the policy 3 |
| Identification information of the UE 3 | Identification information of the policy 3, and identification information of the policy 4 |

It should be noted that this application imposes no limitation to a sequence of performing S201 and S202, and S203 and S204. For example, S201 and S202 may be performed before S203 and S204, or S203 and S204 may be performed before S201 and S202, or S201 and S202, and S203 and S204 may be simultaneously performed.

In this embodiment, in one aspect, the PCF network element may not deliver the policy indicated in the policy information of the UE to the UE. This may save air interface resources, compared with the prior art in which the PCF network element needs to deliver all policies to the UE. In another aspect, when configuring the first policy for the UE, that is, when the policy information of the UE is updated, the PCF network element synchronizes information about an updated policy to the first network element, to help a PCF network element that subsequently serves the UE to obtain latest policy information of the UE from the first network element, thereby helping save air interface resources.

Figure 5:
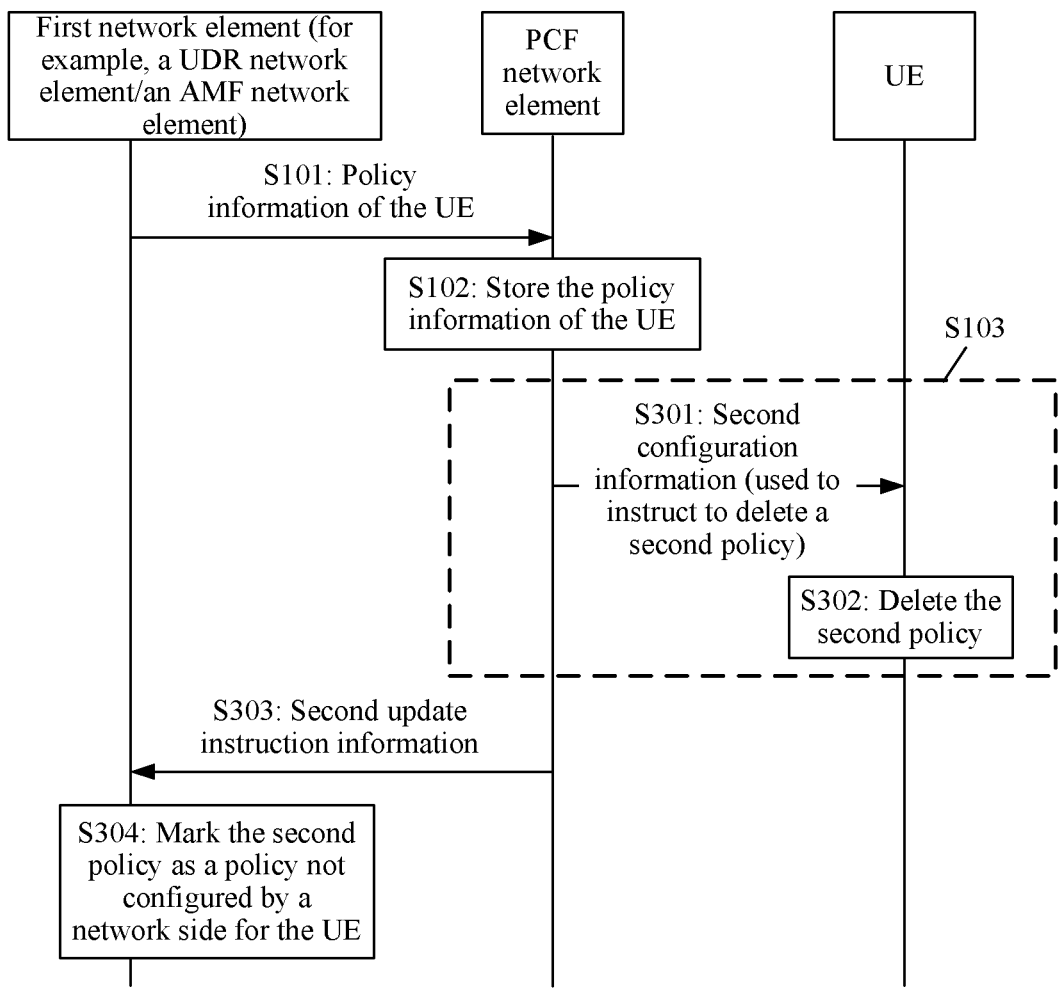
FIG. 5 is a schematic flowchart 3 of a method for configuring a policy for UE according to an embodiment of this application.

FIG. 5 is a flowchart of a method for configuring a policy for UE according to an embodiment of this application. The method may include the following steps.

S301: A PCF network element sends second configuration information to the UE, and the UE receives the second configuration information. The second configuration information is used to indicate the UE to delete a second policy, and the policy indicated in the policy information of the UE in S101 includes the second policy.

A policy deletion indication may carry identification information of the second policy.

Specifically, the PCF network element may determine, based on information such as a change of a position of the UE and a change of subscription information of the UE, that one or more policies configured by a network side for the UE are no longer applicable, and therefore send the second configuration information to the UE. The PCF network element may send the second configuration information to the UE through an AMF network element. The second policy is a policy that is determined by the PCF network element and that is no longer applicable to the UE.

S302: The UE deletes the second policy based on the second configuration information. Specifically, the UE deletes content of the second policy and the identification information of the second policy based on the second configuration information.

Subsequently, the UE can no longer perform, based on the second policy, an operation corresponding to the second policy. For example, assuming that the second policy is an ANDSP, the UE can no longer perform network access based on an access mode indicated in the second policy.

S303: The PCF network element sends second update indication information to a first network element, and the first network element receives the second update indication information. The second update indication information is used to indicate the first network element to update policy information of the UE that is locally stored in the first network element, and specifically to mark the second policy as a policy that is configured for the UE and that is deleted by the network side, namely, as a policy not configured by the network side for the UE. The second update indication information may carry the identification information of the second policy.

S304: Based on the second update indication information, the first network element marks the second policy as the policy not configured by the network side for the UE.

For example, referring to Table 1, if the UE is the UE 2, the policy indicated in the policy information of the UE in S101 may be the policy 1 and the policy 2. That is, policies configured by the network side for the UE are the policy 1 and the policy 2. In this embodiment, the second policy may be the policy 1 or the policy 2. If the second policy is the policy 1, after S304 is performed, policy information of each UE that is stored in the first network element may be shown in Table 6.

TABLE 6

| Identification information of the UE | Identification information of the policy configured by the network side for the UE |
| --- | --- |
| Identification information of the UE 1 | Identification information of the policy 1 |
| Identification information of the UE 2 | Identification information of the policy 2 |
| Identification information of the UE 3 | Identification information of the policy 3, and identification information of the policy 4 |

It should be noted that this application imposes no limitation to a sequence of performing S301 and S302, and S303 and S304. For example, S301 and S302 may be performed before S303 and S304, or S303 and S304 may be performed before S301 and S302, or S301 and S302, and S303 and S304 may be simultaneously performed.

It should be additionally noted that if S301 and S302 are performed first, in a possible implementation, after the UE executes receiving the second configuration information in S301, if the UE determines that the second policy is locally stored, the UE performs S302. After S302 is performed, S303 and S304 may be performed. If the UE determines that the second policy is not locally stored, the UE may send error indication information to the PCF network element. The error indication information is used to indicate that the second policy is not stored in the UE. After the PCF network element receives the error indication information, S303 and S304 may no longer be performed. If S303 and S304 are performed first, in a possible implementation, after a first network element receives second update indication information in S303, if the first network element determines that the second policy is locally marked as a policy configured by the network side for the UE, the first network element performs S304. After S304 is performed, S301 and S302 may be performed. If the first network element determines that the second policy is not locally marked as a policy configured by the network side for the UE, the first network element may send error indication information to the PCF network element. The error indication information is used to indicate that the second policy is not stored in the first network element. After the PCF network element receives the error indication information, S301 and S302 may no longer be performed. If S301 and S302, and S303 and S304 are simultaneously performed, both the UE and the first network may send error indication information to the PCF network element when determining that the second policy is not locally stored. Any one of the foregoing implementations in which error indication information is sent helps enable, under control of the PCF network element, information that is about the policy configured by the network side for the UE and that is stored in the UE to be consistent with information that is about the policy configured by the network side for the UE and that is stored in the first network element, thereby helping avoid occurrence of a problem that air interface resources are wasted because the network side repeatedly configures a same policy for the UE. In addition, this conception may also be applied to the embodiment of configuring a policy for UE shown in FIG. 4. In this case, the error indication information may be used to indicate that the first policy is locally stored. A specific solution is not described in detail herein.

In this embodiment, the PCF network element may manage the policy indicated in the policy information of the UE in S101. Specifically, the PCF network element may delete one or more policies in these policies. In addition, when the policy information of the UE is updated because the one or more policies are deleted, information about an updated policy is synchronized to the first network element, to help a PCF network element that subsequently serves the UE to obtain latest policy information of the UE from the first network element, thereby helping save air interface resources.

It should be noted that based on the technical solution shown in FIG. 4 or FIG. 5, if the first network element is the AMF network element, update indication information (such as the first update indication information or the second update indication information) sent by the PCF network element to the AMF network element needs to be identified by the AMF network element, so that the AMF network element can update the stored policy information of the UE based on the update indication information. Based on this, in a possible implementation, the update indication information may be information other than a NAS container in a message transmitted between the PCF network element and the AMF network element. In addition, the first configuration information, the second configuration information, and third configuration information below that are sent by the PCF network element to the UE through the AMF network element may be transparently transmitted by using a NAS.

Figure 6:
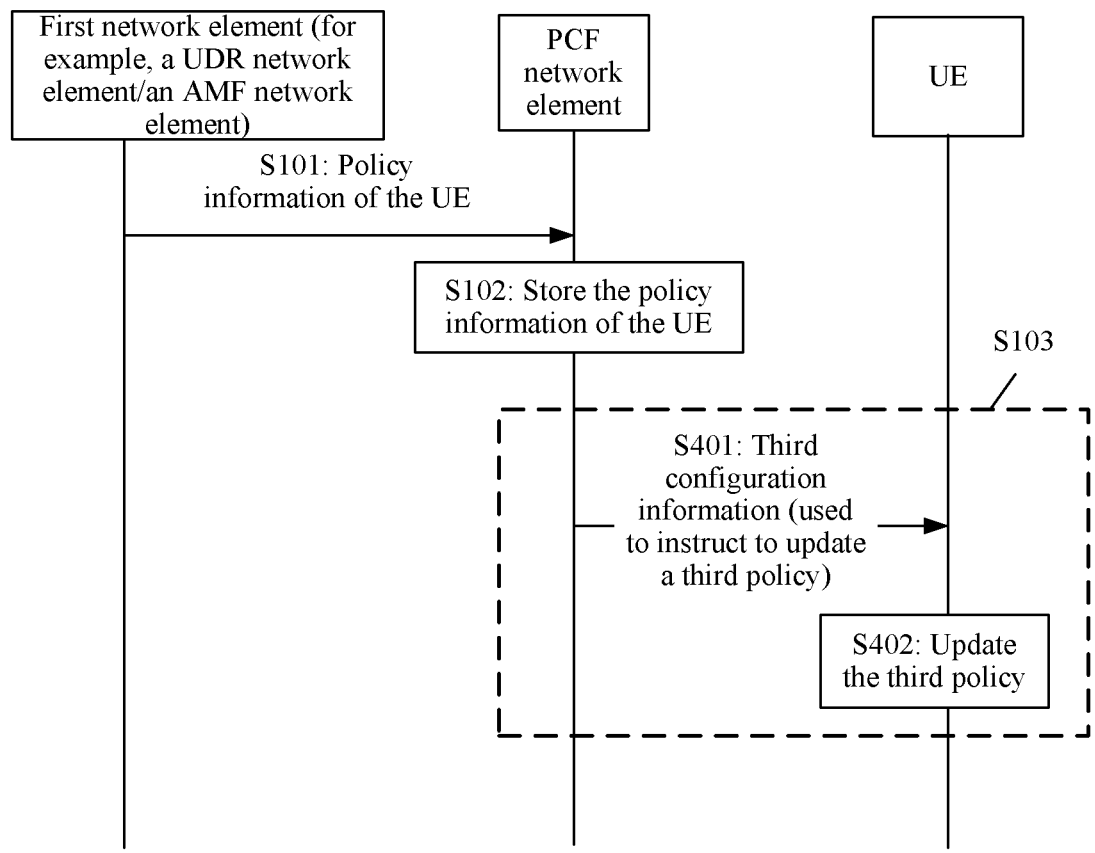
FIG. 6 is a schematic flowchart 4 of a method for configuring a policy for UE according to an embodiment of this application.

FIG. 6 is a flowchart of a method for configuring a policy for UE according to an embodiment of this application. The method may include the following steps.

S401: A PCF network element sends third configuration information to the UE, and the UE receives the third configuration information. The third configuration information is used to indicate the UE to update a third policy, and the policy indicated in the policy information of the UE in S101 includes the third policy. Updating the third policy is specifically updating content of the third policy.

The third configuration information may carry identification information of the third policy and information about a new third policy. The information about the new third policy may be all information about the new third policy, information about a difference between the new third policy and the third policy currently stored in the UE, or the like. This is not limited in this application.

Specifically, the PCF network element may determine, based on information such as a change of a position of the UE and a change of subscription information of the UE, that content of one or more policies configured by a network side for the UE needs to be changed, and therefore send the third configuration information to the UE. The PCF network element may send the third configuration information to the UE through an AMF network element.

S402: The UE updates the currently stored third policy to the new third policy based on the third configuration information.

For example, referring to Table 1, if the UE is the UE 2, the policy indicated in the policy information of the UE in S101 may be the policy 1 and the policy 2. That is, policies configured by the network side for the UE are the policy 1 and the policy 2. In this embodiment, the third policy may be the policy 1 or the policy 2.

In the technical solution provided in this embodiment, the PCF network element may manage the policy indicated in the policy information of the UE in S101. Specifically, the PCF network element may update content of one or more policies in these policies. It may be understood that based on the mode 1 or the mode 2, the PCF network element does not need to synchronize information about an updated policy to a first network element.

It should be noted that the foregoing uses a policy as a granularity to describe the method for configuring a policy for UE provided in this application. In an actual implementation process, a policy group may also be used as a granularity to configure a policy for UE, and one policy group includes one or more policies. The configuration information may include at least two of the first configuration information, the second configuration information, or the third configuration information. The PCF network element needs to send the configuration information that includes the at least two of the first configuration information, the second configuration information, or the third configuration information to the UE. Different configuration information in the configuration information is used to separately indicate the UE to perform different operations.

Figure 7:
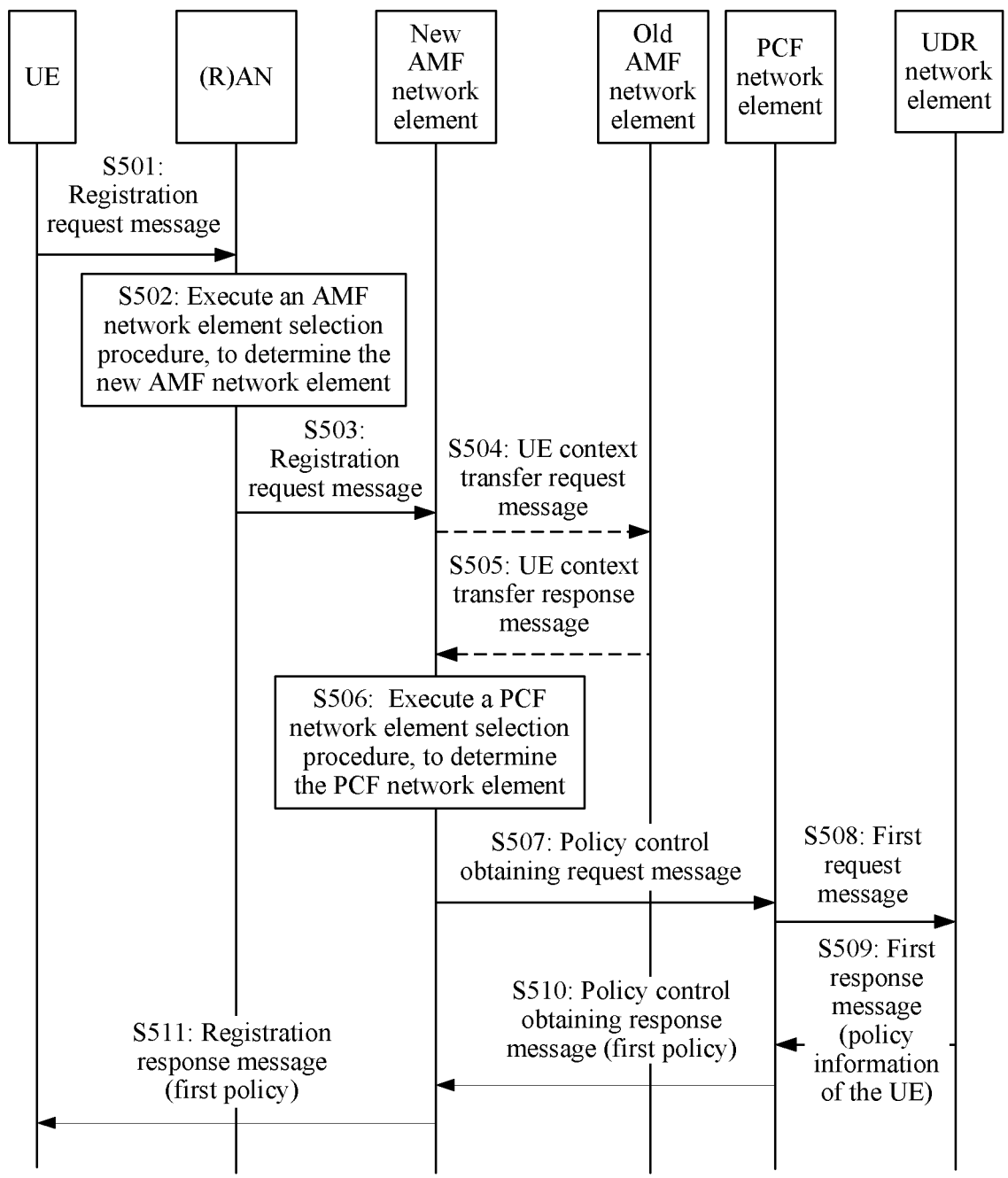
FIG. 7 is a schematic flowchart 5 of a method for configuring a policy for UE according to an embodiment of this application.

That a first network element is a UDR network element is used as an example. FIG. 7 is a schematic diagram of a registration procedure to which the technical solution shown in FIG. 3 is applied. The following steps are specifically included.

S501: UE sends a registration request message to a (R)AN.

S502: After receiving the registration request message, the (R)AN executes an AMF network element selection procedure, to determine an AMF network element (referred to as a new AMF network element below) that serves the UE in a current registration process of the UE.

S503: The (R)AN sends the registration request message to the new AMF network element.

It should be noted that after the (R)AN receives the registration request message sent by the UE, the (R)AN may usually assign a 5G temporary identifier to the UE. In addition, the (R)AN may determine, based on the 5G temporary identifier, whether the UE accesses another AMF network element (namely, an old AMF network element) before this registration procedure is executed. If the UE accesses the old AMF network element before, identification information of the old AMF network element is carried in the registration request message in S503. If the new AMF network element and the old AMF network element are not a same network element, S504 and S505 may be performed, so that the new AMF network element obtains context information of the UE by exchanging information with the old AMF network element. Then, S506 may be performed. If the new AMF network element and the old AMF network element are a same network element, S506 may be directly performed. If the UE does not access the old AMF network element before, the new AMF network element may establish context information of the UE based on a prior-art procedure, to perform S506. A procedure of establishing the context information of the UE is described in detail in the prior art, and details are not described herein.

S504: The new AMF network element sends a context transfer request message to the old AMF network element. The context transfer request message carries identification information of the UE, and is used to request the context information of the UE. The identification information of the UE may be the 5G temporary identifier.

S505: The old AMF network element sends a context transfer response message to the new AMF network element. The context transfer response message carries the context information of the UE.

S506: The new AMF network element executes a PCF network element selection procedure, to determine a PCF network element that serves the UE in the current registration process of the UE.

S507: The new AMF network element sends a policy control obtaining request message to the PCF network element. The policy control obtaining request message is used to request the PCF network element to deliver a policy to the UE.

S508: The PCF network element sends a first request message to the UDR network element. The first request message is used to request policy information of the UE.

S509: The UDR network element sends a first response message to the PCF network element. The first response message carries the policy information of the UE, and the policy information of the UE is used to indicate a policy of the UE.

If the PCF network element is the first PCF network element to which the UE connects, a network side does not configure any policy for the UE. In this case, the UDR network element does not store information about a policy configured by the network side for the UE. Therefore, the policy indicated in the policy information of the UE in S509 is null. The PCF network element may configure a policy for the UE based on a method provided in the prior art.

If the PCF network element is not the first PCF network element to which the UE connects, a network side may have configured one or more policies for the UE. In this case, the UDR network element may store information about a policy configured by the network side for the UE. Therefore, the policy indicated in the policy information of the UE in S509 is not null.

In addition, it may be understood that if the PCF network element is not the first PCF network element to which the UE connects, the UDR network element may not store information about a policy configured by the network side for the UE, because the network side performs at least the method for configuring a policy for UE shown in FIG. 5. In this case, the policy indicated in the policy information of the UE in S509 is null. The PCF network element may configure a policy for the UE based on a method provided in the prior art.

It should be noted that regardless of whether the UE is registered, the UDR network element may store the policy information of the UE.

After S509 is performed, the method may further include: storing, by the PCF network element, the policy information of the UE. Subsequently, for how the PCF network element uses the policy information of the UE, refer to FIG. 4 to FIG. 6. In an example, when the PCF network element performs the following S510 and S511, a policy control obtaining response message and a registration response message may carry at least one of the first configuration information and the second configuration information. In addition, after performing S510, the PCF network element may alternatively perform the method for configuring a UE policy shown in any one of FIG. 4 to FIG. 6 when determining a case such as a change of a position of the UE or a change of subscription information of the UE. This is not limited in this application.

S510: The PCF network element sends the policy control obtaining response message to the new AMF network element.

S511: The new AMF network element sends the registration response message to the UE.

It should be noted that the registration procedure shown in FIG. 7 merely shows some steps related to the technical solution shown in FIG. 3, to describe an application scenario of the technical solution shown in FIG. 3. In actual implementation, the registration procedure may further include an AUSF network element selection procedure, an authentication procedure, and the like. These related procedures are described in detail in the prior art, and details are not described herein.

Figure 8:
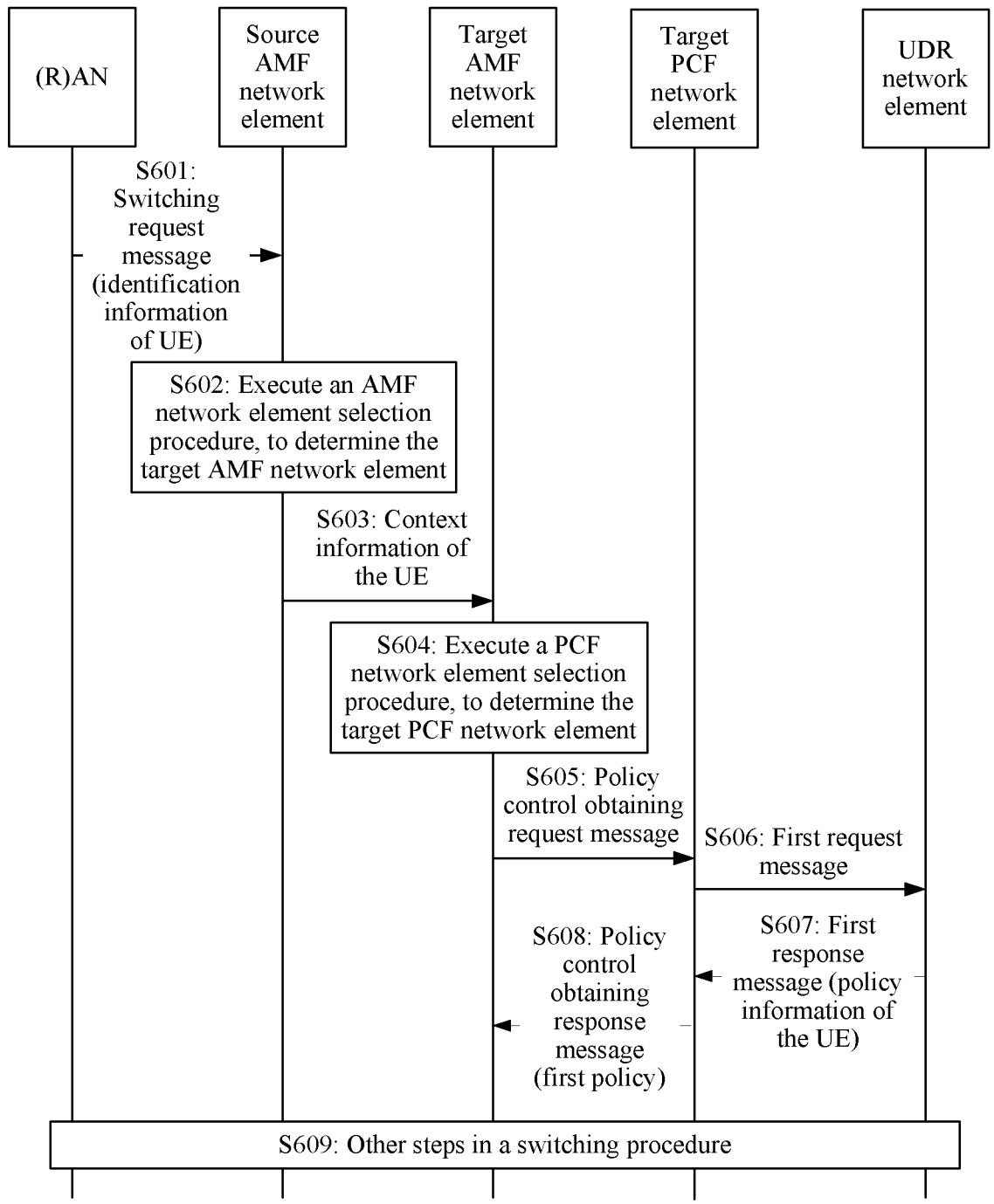
FIG. 8 is a schematic flowchart 6 of a method for configuring a policy for UE according to an embodiment of this application.

That a first network element is a UDR network element is used as an example. FIG. 8 is a schematic diagram of an AMF network element switching procedure to which the technical solution shown in FIG. 3 is applied. The following steps are specifically included.

S601: When determining that AMF network element switching needs to be performed for UE, a (R)AN sends a switching request message to an AMF network element (namely, a source AMF network element) that currently serves the UE. The switching request message may carry identification information of the UE, and is used to request to switch the AMF network element.

S602: After receiving the switching request message, the source AMF network element executes an AMF network element selection procedure to select a target AMF network element.

S603: The source AMF network element sends context information of the UE to the target AMF network element.

S604: After receiving the context information of the UE, the target AMF network element executes a PCF network element selection procedure to select a target PCF network element. A source PCF network element and the target PCF network element may be the same, or may be different. If the source PCF network element and the target PCF network element are different, S605 is to be performed.

S605: The target AMF network element sends a policy control obtaining request message to the target PCF network element. The policy control obtaining request message is used to request to deliver a policy to the UE.

S606: The target PCF network element sends a first request message to the UDR network element. The first request message is used to request policy information of the UE.

S607: The UDR network element sends a first response message to the target PCF network element. The first response message carries the policy information of the UE, and the policy information of the UE is used to indicate a policy of the UE.

S608: The target PCF network element sends a policy control obtaining response message to the target AMF network element.

For example, the policy control obtaining response message may carry one or more first policies. For a description of the first policy, refer to the foregoing descriptions. Certainly, the policy control obtaining response message may alternatively not carry a policy. Instead, after the AMF network element switching procedure ends, the PCF network element performs the method for configuring a UE policy shown in any one of FIG. 4 to FIG. 6 when determining a case such as a change of a position of the UE or a change of subscription information of the UE. This is not limited in this application.

S609: Perform other steps in the switching procedure.

It should be noted that the AMF network element switching procedure shown in FIG. 8 merely shows some steps related to the technical solution shown in FIG. 3, to describe an application scenario of the technical solution shown in FIG. 3. In actual implementation, the AMF network element switching procedure may further include other steps. These steps are described in detail in the prior art, and details are not described herein.

Figure 9:
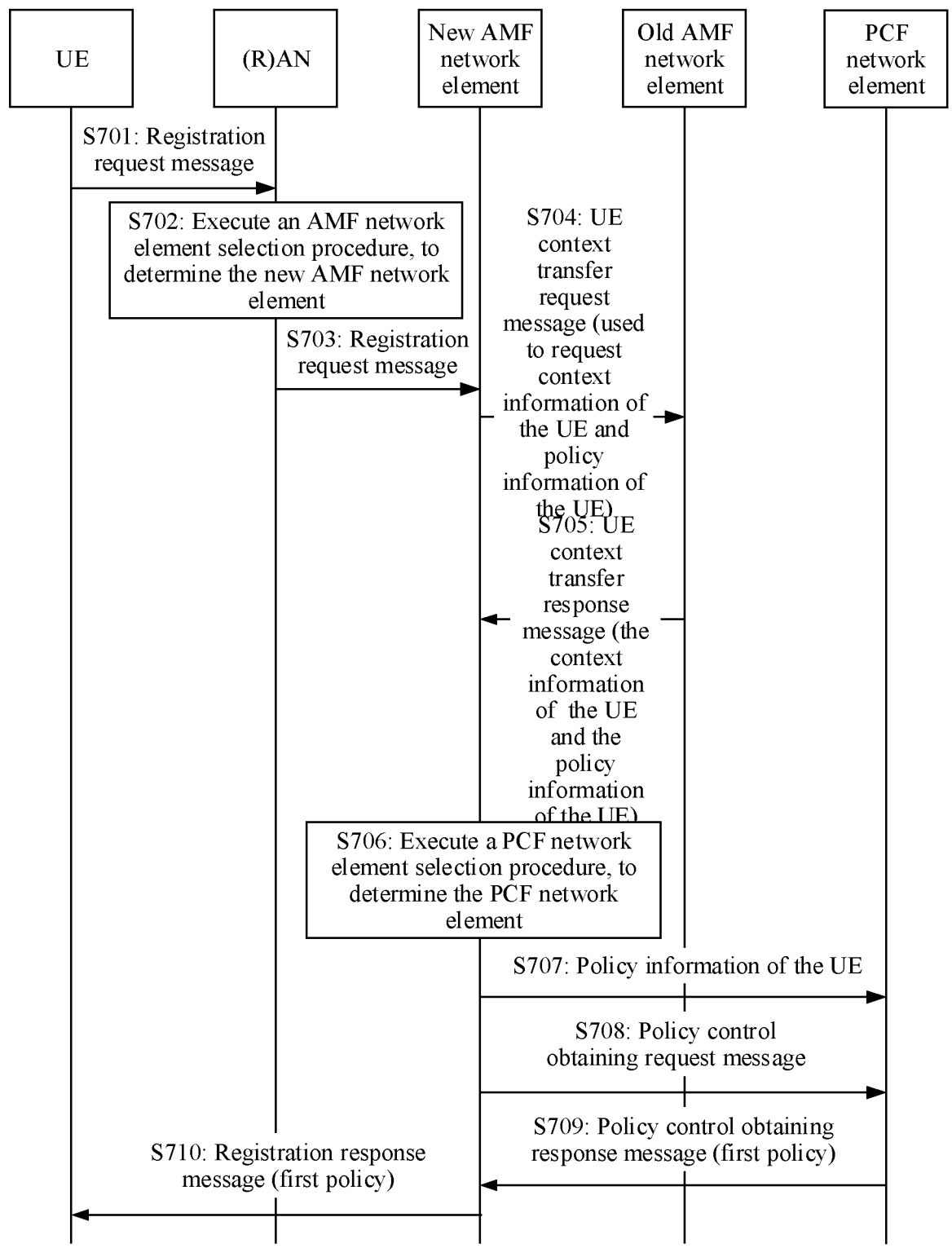
FIG. 9 is a schematic flowchart 7 of a method for configuring a policy for UE according to an embodiment of this application.

That a first network element is an AMF network element is used as an example. FIG. 9 is a schematic diagram of a registration procedure to which the technical solution shown in FIG. 3 is applied. The following steps are specifically included.

S701 to S703: Refer to the foregoing S501 to S503. Certainly, this application is not limited thereto.

It should be noted that referring to the description in S503, if the new AMF network element and the old AMF network element are a same network element, or if the UE does not access the old AMF network element before, S706 and S708 to S710 may be directly performed after S703 is performed. Certainly, this application is not limited thereto. It should be additionally noted that regardless of whether the UE is registered, the AMF network element may store policy information of the UE.

S704: The new AMF network element sends a context transfer request message to the old AMF network element. The context transfer request message carries identification information of the UE, and is used to request the context information of the UE. The context transfer request message may be further used to request the policy information of the UE.

S705: The old AMF network element sends a context transfer response message to the new AMF network element. The context transfer response message carries the context information of the UE and the policy information of the UE, and the policy information of the UE is used to indicate a policy of the UE.

S706: The new AMF network element executes a PCF network element selection procedure, to determine a PCF network element that serves the UE in the current registration process of the UE.

S707: The new AMF network element sends the policy information of the UE to the PCF network element.

After S707 is performed, the method may further include: storing, by the PCF network element, the policy information of the UE. Subsequently, for how the PCF network element uses the policy information of the UE, refer to FIG. 4 to FIG. 6. In an example, when the PCF network element performs the following S709 and S710, a policy control obtaining response message and a registration response message may carry at least one of the first configuration information and the second configuration information. In addition, after performing S709, the PCF network element may alternatively perform the method for configuring a UE policy shown in any one of FIG. 4 to FIG. 6 when determining a case such as a change of a position of the UE or a change of subscription information of the UE. This is not limited in this application.

S708: The new AMF network element sends a policy control obtaining request message to the PCF network element. The policy control obtaining request message is used to request to deliver a policy to the UE.

In a possible implementation, the policy information of the UE in S707 may be carried in the policy control obtaining request message in S708 to be sent by the new AMF network element to the PCF network element. In another possible implementation, the policy information of the UE in S707 and a control policy obtaining request in S708 are two independently designed messages. In this case, this application imposes no limitation to a sequence of performing S707 and S708.

S709: The PCF network element sends the policy control obtaining response message to the new AMF network element.

S710: The new AMF network element sends the registration response message to the UE.

It should be noted that the registration procedure shown in FIG. 9 merely shows some steps related to the technical solution shown in FIG. 3, to describe an application scenario of the technical solution shown in FIG. 3. In actual implementation, the registration procedure may further include an AUSF network element selection procedure, an authentication procedure, and the like. These related procedures are described in detail in the prior art, and details are not described herein.

Figure 10:
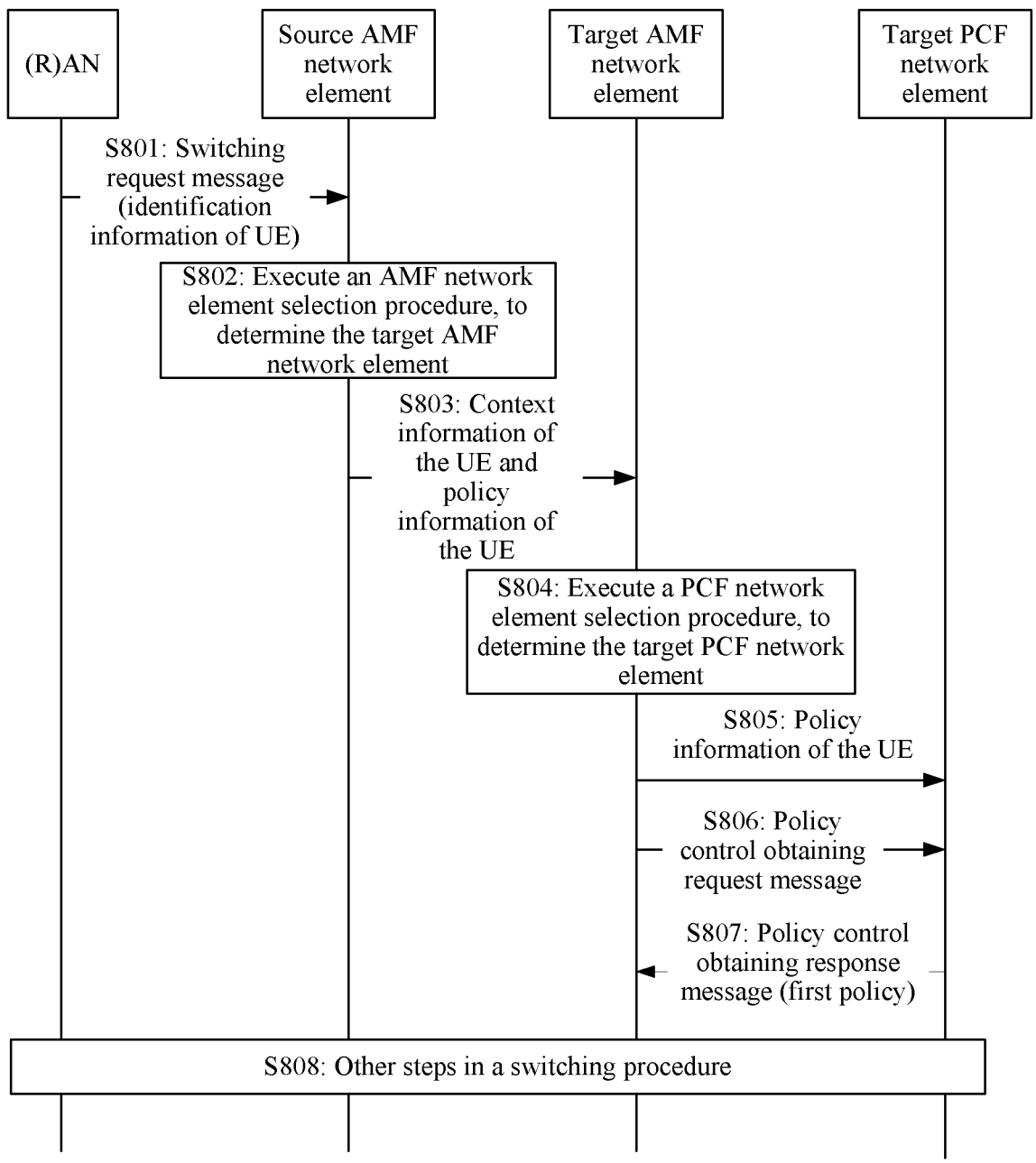
FIG. 10 is a schematic flowchart 8 of a method for configuring a policy for UE according to an embodiment of this application.

That a first network element is an AMF network element is used as an example. FIG. 10 is a schematic diagram of an AMF network element switching procedure to which the technical solution shown in FIG. 3 is applied. The following steps are specifically included.

S801 and S802: Refer to the foregoing S601 and S602. Certainly, this application is not limited thereto.

S803: The source AMF network element sends context information of the UE and policy information of the UE to the target AMF network element. The policy information of the UE is used to indicate a policy of the UE. The context information of the UE and the policy information of the UE may be carried in a same message, or may be carried in different messages.

S804: After receiving the context information of the UE and the policy information of the UE, the target AMF network element executes a PCF network element selection procedure to select a target PCF network element.

A source PCF network element and the target PCF network element may be the same, or may be different. If the source PCF network element and the target PCF network element are different, S805 is to be performed.

S805: The target AMF network element sends the policy information of the UE to the target PCF network element.

S806: The target AMF network element sends a policy control obtaining request message to the target PCF network element. The policy control obtaining request message is used to request a network side to deliver a policy to the UE.

In a possible implementation, the policy information of the UE in S805 may be carried in the policy control obtaining request message in S806 to be sent by the target AMF network element to the target PCF network element. In another possible implementation, the policy information of the UE in S805 and a control policy obtaining request in S806 are two independently designed messages. In this case, this application imposes no limitation to a sequence of performing S805 and S806.

S807: The target PCF network element sends a policy control obtaining response message to the target AMF network element.

S808: Perform other steps in the switching procedure.

It should be noted that the AMF network element switching procedure shown in FIG. 10 merely shows some steps related to the technical solution shown in FIG. 3, to describe an application scenario of the technical solution shown in FIG. 3. In actual implementation, the AMF network element switching procedure may further include other steps. These steps are described in detail in the prior art, and details are not described herein.

Figure 11:
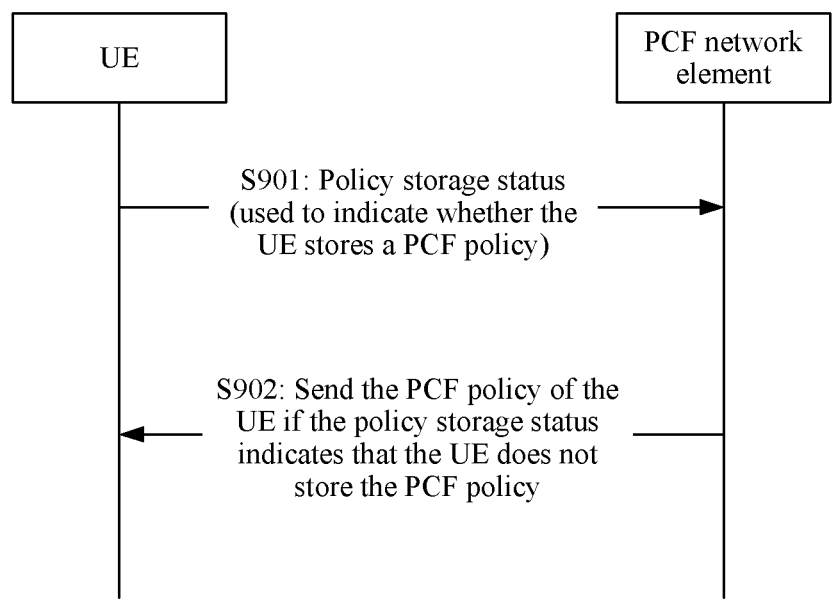
FIG. 11 is a schematic flowchart 9 of a method for configuring a policy for UE according to an embodiment of this application.

In some embodiments of this application, considering that a policy that is stored in UE and that is configured by a network side for the UE may be lost, for example, a policy received before replacement of a subscriber identity module (SIM) card of the UE is lost caused by the replacement of the SIM card, this application provides a technical solution shown in FIG. 11. The technical solution may be applied to any one of the embodiments provided above. As shown in FIG. 11, the technical solution may specifically include the following steps.

S901: UE sends policy storage status information to a PCF network element, and the PCF network element receives the policy storage status information. The policy storage status information is used to indicate whether the UE stores a PCF policy. The PCF policy may be a policy indicated in policy information of the UE, as described above. For related description of the policy information of the UE, refer to the foregoing descriptions.

This embodiment imposes no limitation to a trigger condition of S901. For example, in a possible implementation, the policy storage status information may be carried in a registration request message. In another implementation, the UE may send the policy storage status information to the PCF network element after receiving configuration information sent by the PCF network element. That the UE receives the configuration information sent by the PCF network element may be reflected as, including but not limited to, any one of the foregoing methods in FIG. 4 to FIG. 6.

S902: If the policy storage status information indicates that the UE does not store the PCF policy, the PCF network element sends the PCF policy to the UE, and the UE receives the PCF policy.

If the PCF network element sends a policy other than the PCF policy to the UE before S902 is performed, in S902, the PCF network element needs to send only the policy indicated in the policy information of the UE in S101 to the UE. The policy indicated in the policy information of the UE may be sent at one time or many times.

If the PCF network element does not send a policy other than the PCF policy to the UE before S902 is performed, in S902, the PCF network element may send, to the UE, all policies that need to be configured by the network side for the UE. All the policies may be sent at one time or many times.

It should be noted that any policy sent by the PCF network element to the UE may be obtained by the PCF network element from a UDR network element. A specific obtaining process is described in detail in the prior art, and details are not described herein.

Figure 12:
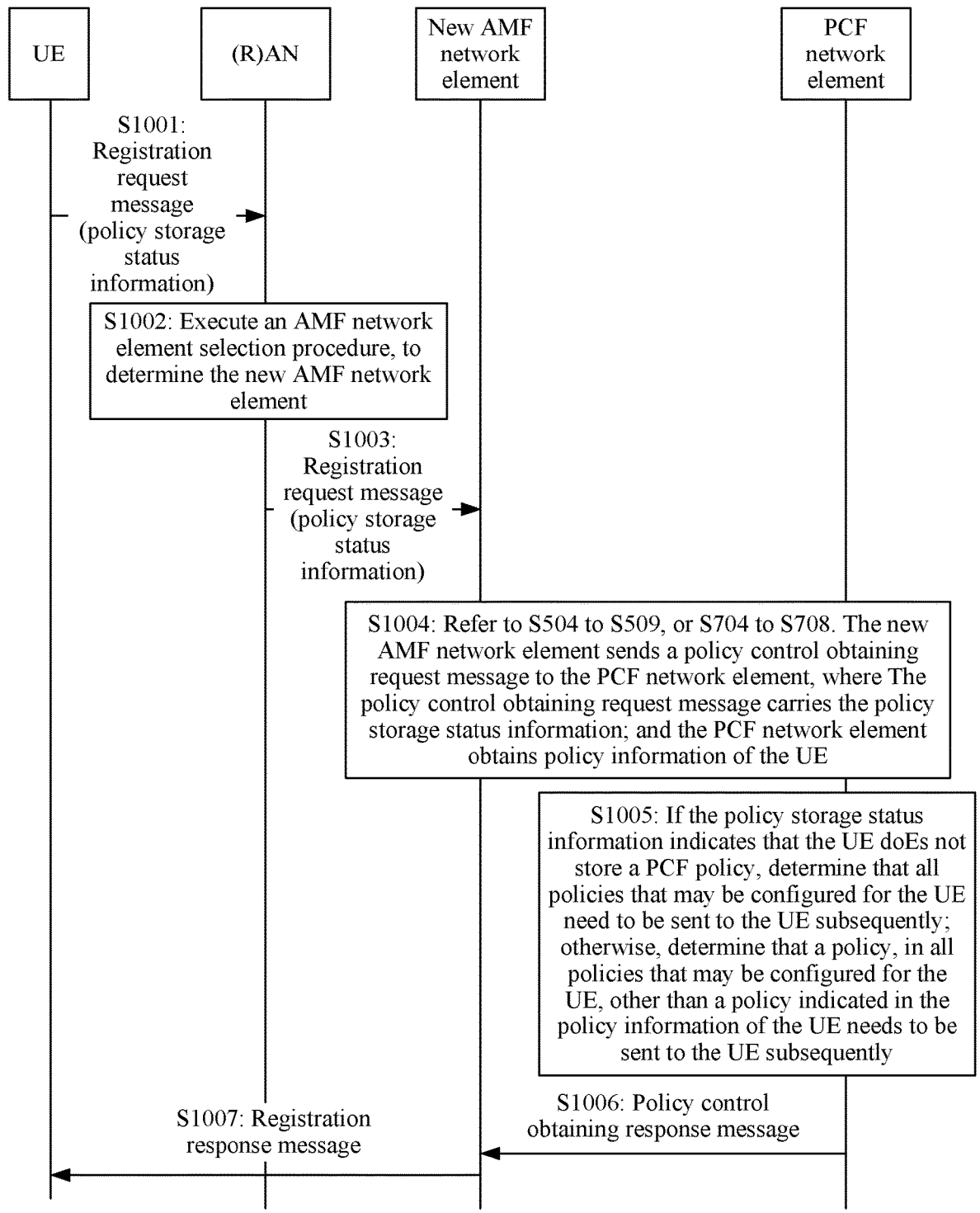
FIG. 12 is a schematic flowchart 10 of a method for configuring a policy for UE according to an embodiment of this application.

That policy storage status information is carried in a registration request message is used as an example. FIG. 12 is a schematic diagram of a registration procedure to which the technical solution shown in FIG. 11 is applied. The following steps are specifically included.

S1001: UE sends a registration request message to a (R)AN. The registration request message carries policy storage status information. The policy storage status information is used to indicate whether the UE stores a PCF policy.

In a possible implementation, the policy storage status information is used to indicate that the UE does not store a PCF policy. In this case, the UE may add the policy storage status information to the registration request message when the UE stores no PCF policy. In another possible implementation, the policy storage status information is used to indicate that the UE stores a PCF policy. In this case, the UE may add the policy storage status information to the registration request message when the UE stores the PCF policy. In another possible implementation, the policy storage status information may carry different information to indicate that the UE stores a PCF policy or indicate that the UE does not store a PCF policy. For example, that the UE stores a PCF policy may be indicated by carrying, not limited to, a binary number "1", and that the UE does not store a PCF policy may be indicated by carrying, not limited to, a binary number "0". Certainly, this application is not limited thereto.

S1002: The (R)AN executes an AMF network element selection procedure to determine a new AMF network element.

S1003: The (R)AN sends the registration request message to the new AMF network element. The registration request message carries the policy storage status information.

S1004: For details, refer to S504 to S509, or S704 to S708. In this process, the new AMF network element sends a policy control obtaining request message to a PCF network element, and the policy control obtaining request message carries the policy storage status information; in addition, the PCF network element obtains policy information of the UE, and the policy information of the UE is used to indicate a policy of the UE.

S1005: If the policy storage status information indicates that the UE does not store a PCF policy, the PCF network element determines that policies that need to be subsequently sent to the UE are all policies that need to be configured for the UE. All the policies may be sent at one time or many times. If the policy storage status information indicates that the UE stores a PCF policy, the PCF network element determines that a policy that needs to be subsequently sent to the UE is a policy, in all policies that need to be configured for the UE, other than the policy indicated in the policy information of the UE in S101. For a procedure in which the PCF network element configures, for the UE, the policy that needs to be sent to the UE, refer to FIG. 4, and details are not described herein. In addition, if the policy storage status information indicates that the UE stores a PCF policy, the PCF network element may further send configuration information to the UE based on the technical solution described in either of FIG. 5 and FIG. 6.

For example, based on Table 1, assuming that the UE is the UE 2, PCF policies determined in a process of performing S1004 are the policy 1 and the policy 2. In S1005, if the policy storage status information indicates that the UE does not store a PCF policy, policies that are determined by the PCF network element and that need to be subsequently sent to the UE are the policies 1 to 4. If the policy storage status information indicates that the UE stores a PCF policy, policies that are determined by the PCF network element and that need to be subsequently sent to the UE are the policies 3 and 4. In addition, the configuration information may be sent to the UE based on the technical solutions shown in either of FIG. 5 and FIG. 6.

S1006: The PCF network element sends a policy control obtaining response message to the new AMF network element.

S1007: The new AMF network element sends a registration response message to the UE.

In a possible implementation, the policy control obtaining response message in S1006 and the registration response message in S1007 carry some or all of the policies that are determined by the PCF network element and that need to be subsequently sent to the UE. Certainly, this application is not limited thereto.

It should be noted that the registration procedure shown in FIG. 12 merely shows some steps related to the technical solution shown in FIG. 11, to describe an application scenario of the technical solution shown in FIG. 11. In actual implementation, the registration procedure may further include other steps. These steps are described in detail in the prior art, and details are not described herein.

Figure 13:
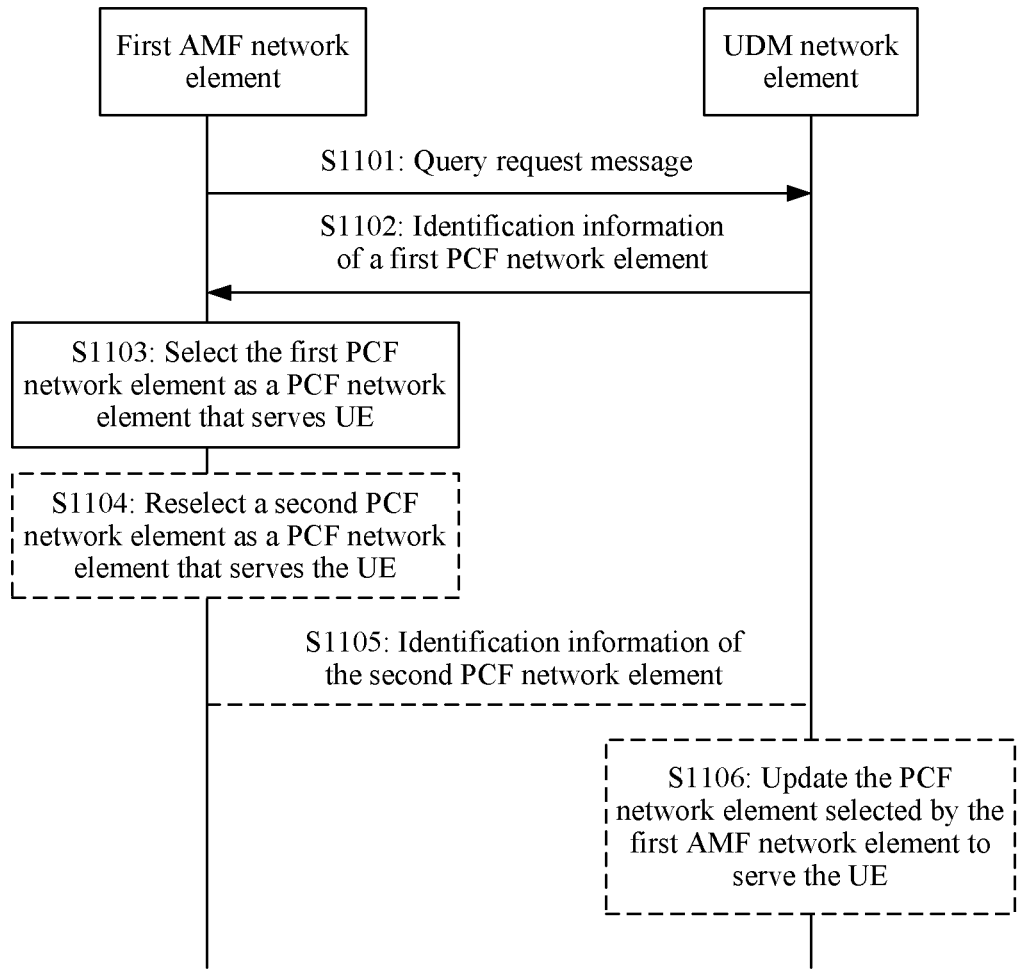
FIG. 13 is a schematic flowchart of determining a PCF network element according to an embodiment of this application.

FIG. 13 shows a method for determining a PCF network element according to an embodiment of this application. The method may be applied to the communications system shown in FIG. 1. The method may include the following steps.

S1101: A first AMF network element sends a query request message to a UDM network element, and the UDM network element receives the query request message. The query request message is used to query identification information of a PCF network element (referred to as a first PCF network element below) selected by a second AMF network element for UE. The query request message may carry identification information of the UE.

The first AMF network element may be an AMF network element that currently serves the UE. Usually, when determining that a PCF network element selection procedure needs to be executed, the first AMF network element may perform S1102.

The second AMF network element and the first AMF network element may be a same network element, or may be different network elements.

If the second AMF network element and the first AMF network element are different network elements, in an implementation, the first AMF network element may be the AMF network element that currently serves the UE, and the second AMF network element may be an AMF network element accessed by the UE before. For example, the first AMF network element is the foregoing new AMF network element, and the second AMF network element is the foregoing old AMF network element. In another implementation, the first AMF network element may be the foregoing target AMF network element, and the second AMF network element is the foregoing source AMF network element. In another implementation, the first AMF network element and the second AMF network element may both be AMF network elements that serve the UE, for example, two AMF network elements that both serve the UE in a roaming scenario.

If the second AMF network element and the first AMF network element are a same network element, an application scenario may be: The first AMF network element may be an AMF network element selected by a (R)AN for the UE when the UE is powered on, and the second AMF network element may be an AMF network element selected by the (R)AN for the UE before the UE is powered off. Usually, the two selected AMF network elements are the same. Because the UE does not delete a stored policy after being powered off, a policy previously delivered by a PCF still exists. Therefore, after the UE is powered on again, when the same PCF network element is selected for the UE, the PCF network element may continue to maintain the policy delivered to the UE.

S1102: The UDM network element sends the identification information of the first PCF network element to the first AMF network element based on the query request message, and the first AMF network element receives the identification information of the first PCF network element.

Implementation 1: The UDM network element stores identification information of PCF network elements selected by an AMF network element for the UE. The identification information, stored in the UDM network element, of these PCF network elements may be reported to the UDM network element after the AMF network element executes the PCF network element selection procedure. In this implementation, after receiving the query request message, the UDM network element may query the identification information, stored in the UDM network element, of the PCF network elements selected by the AMF network element for the UE, to determine the identification information of the first PCF network element.

Implementation 2: After receiving the query request message, the UDM network element may query the identification information of the first PCF network element from the second AMF network element. It may be understood that because after the (R)AN executes an AMF network element selection procedure, a selected AMF network element is registered with the UDM network element, the UDM network element may obtain identification information of the second AMF network element, and therefore may query the identification information of the first PCF network element from the second AMF network element.

S1103: After receiving the identification information of the first PCF network element, the first AMF network element selects the first PCF network element as a PCF network element that serves the UE.

In the technical solution provided in this embodiment, the first AMF network element queries, from the UDM network element, the identification information of the PCF network element selected by the second AMF network element for the UE, to use the PCF network element as the PCF network element selected by the first AMF network element for the UE. This may help avoid a problem that because two AMF network elements that successively (or both) serve same UE select different PCF network elements or one AMF network element selects different PCF network elements at different moments, the two PCF network elements configure different policies for the UE, and consequently the UE does not know which policy is to be executed.

Optionally, after S1103 is performed, with a change of a position of the UE, a change of subscription information of the UE, or the like, the first AMF network element may need to reselect a PCF network element for the UE. In this case, based on the implementation 1, the method may further include the following steps:

S1104: The first AMF network element reselects a second PCF network element as a PCF network element that serves the UE.

S1105: The first AMF network element sends identification information of the second PCF network element to the UDM network element, so that the UDM network element updates the PCF network element selected by the first AMF network element to serve the UE.

S1106: The UDM network element updates the PCF network element selected by the first AMF network element to serve the UE.

This optional embodiment helps an AMF network element that subsequently serves the UE to obtain latest identification information of a PCF network element that serves the UE from the UDM network element, thereby helping avoid a problem that because different AMF network elements that successively (or all) serve same UE select different PCF network elements or one AMF network element selects different PCF network elements at different moments, the two PCF network elements configure different policies for the UE, and consequently the UE does not know which policy is to be executed.

The foregoing mainly describes the solutions provided in the embodiments of this application from a perspective of a method. To implement the foregoing functions, corresponding hardware structures and/or software modules for implementing the functions is provided. A person skilled in the art should be easily aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, an apparatus for configuring a policy for UE (including a PCF network element, a first network element, UE, and the like) or an apparatus for determining a PCF network element (including a UDR network element, a first AMF network element, or the like) may be divided into function modules based on the foregoing method examples. For example, each function module may be obtained through division for a corresponding function, or two or more functions may be integrated into one processing module. The integrated module may be implemented in a form of hardware, or may be implemented in a form of a software function module. It should be noted that the module division in the embodiments of this application is an example, and is merely logical function division. In actual implementation, another division manner may be used.

Figure 14:
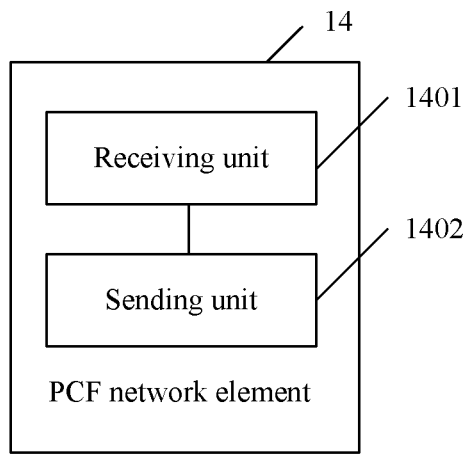
FIG. 14 is a schematic structural diagram of a PCF network element according to an embodiment of this application.

FIG. 14 is a schematic structural diagram of a PCF network element according to an embodiment of this application. The PCF network element 14 shown in FIG. 14 may be configured to perform a step performed by the corresponding PCF network element in any method for configuring a policy for UE provided above. The PCF network element 14 may include a receiving unit 1401 and a sending unit 1402. The receiving unit 1401 is configured to receive policy information of the UE that is sent by a first network element, where the policy information of the UE is used to indicate a policy of the UE. The sending unit 1402 is configured to send configuration information to the UE based on at least the policy information of the UE, where the configuration information is used to indicate the UE to update the policy of the UE. The first network element may be a UDR network element or an AMF network element. The policy information of the UE is used to indicate at least one of a URSP, an ANDSP, and a WLANSP of the UE. The policy information may further include transmission status information, and the transmission status information is used to indicate whether the policy indicated in the policy information is transmitted to the UE.

For example, with reference to any one of FIG. 3 to FIG. 6, the PCF network element 14 may be the PCF network element in any one of FIG. 3 to FIG. 6. The receiving unit 1401 may be configured to perform a receiving step in S101. The sending unit 1402 may be configured to perform a sending step in S103.

For example, with reference to FIG. 7, the PCF network element 14 may be the PCF network element in FIG. 7, and the first network element may be the UDR network element in FIG. 7. The receiving unit 1401 may be configured to perform a receiving step in S509. The sending unit 1402 may be configured to perform a sending step in S510.

For example, with reference to FIG. 8, the PCF network element 14 may be the target PCF network element in FIG. 8, and the first network element may be the UDR network element in FIG. 8. The receiving unit 1401 may be configured to perform a receiving step in S607. The sending unit 1402 may be configured to perform a sending step in S608.

For example, with reference to FIG. 9, the PCF network element 14 may be the PCF network element in FIG. 9, and the first network element may be the new AMF network element in FIG. 9. The receiving unit 1401 may be configured to perform a receiving step in S707. The sending unit 1402 may be configured to perform a sending step in S709.

For example, with reference to FIG. 10, the PCF network element 14 may be the target PCF network element in FIG. 10, and the first network element may be the target AMF network element in FIG. 10. The receiving unit 1401 may be configured to perform a receiving step in S805. The sending unit 1402 may be configured to perform a sending step in S807.

Optionally, if the configuration information includes first configuration information, the sending unit 1402 may be specifically configured to send the first configuration information to the UE, where the first configuration information is used to indicate a first policy of the UE, and the policy indicated in the policy information of the UE does not include the first policy. For example, with reference to FIG. 4, the sending unit 1402 may be configured to perform a sending step in S201.

Optionally, if the configuration information includes second configuration information, the sending unit 1402 may be specifically configured to send the second configuration information to the UE, where the second configuration information is used to indicate the UE to delete a second policy, and the policy indicated in the policy information of the UE includes the second policy. For example, with reference to FIG. 5, the sending unit 1402 may be configured to perform a sending step in S301.

Optionally, if the configuration information includes third configuration information, the sending unit 1402 may be specifically configured to send the third configuration information to the UE, where the third configuration information is used to indicate the UE to update a third policy, and the policy indicated in the policy information of the UE includes the third policy. For example, with reference to FIG. 6, the sending unit 1402 may be configured to perform a sending step in S401.

Optionally, the sending unit 1402 may be further configured to send update indication information to the first network element, where the update indication information includes at least one of the configuration information and a configuration information identifier, and the configuration information identifier is used to indicate the configuration information. For example, with reference to FIG. 4, the update indication information may be the first update indication information in FIG. 4, and the configuration information may be the first configuration information in FIG. 4. The sending unit 1402 may be configured to perform a sending step in S203. For example, with reference to FIG. 5, the update indication information may be the second update indication information in FIG. 5, and the configuration information may be the second configuration information in FIG. 5. The sending unit 1402 may be configured to perform a sending step in S303.

Optionally, the receiving unit 1401 may be further configured to receive policy storage status information sent by the UE, where the policy storage status information is used to indicate whether the UE stores a PCF policy. In this case, the sending unit 1402 may be further configured to send the PCF policy to the UE if the policy storage status information indicates that the UE does not store the PCF policy. For example, with reference to FIG. 11, the receiving unit 1401 may be configured to perform a receiving step in S901. The sending unit 1402 may be configured to perform a sending step in S902.

Optionally, the receiving unit 1401 may be specifically configured to receive a policy control obtaining request message sent by an AMF network element, where the policy control obtaining request message carries the policy storage status information, and the AMF network element sends the policy control obtaining request message to the PCF network element after receiving a registration request message sent by the UE.

For a description of related content in this embodiment, refer to the foregoing method embodiments. Details are not described herein. In an example, with reference to the communications device in FIG. 2, the receiving unit 1401 and the sending unit 1402 may correspond to the communications interface 404 in FIG. 2.

Figure 15:
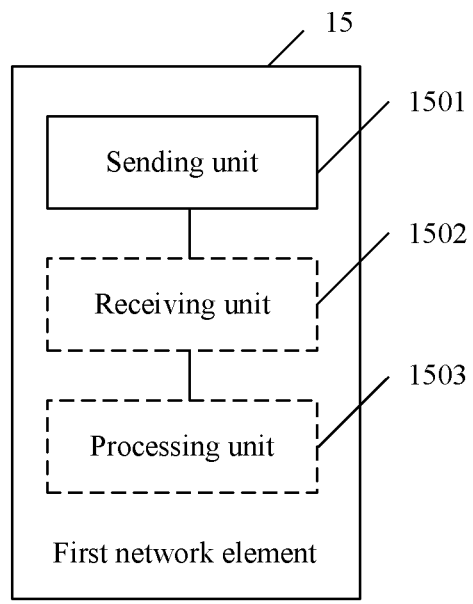
FIG. 15 is a schematic structural diagram of a first network element according to an embodiment of this application.

FIG. 15 is a schematic structural diagram of a first network element according to an embodiment of this application. The first network element 15 shown in FIG. 15 may be configured to perform a step performed by the corresponding first network element in any method for configuring a policy for UE provided above. The first network element 15 may include a sending unit 1501. The sending unit 1501 is configured to send policy information of the UE to a PCF network element, to indicate the PCF network element to send configuration information to the UE based on the policy information of the UE, where the policy information of the UE is used to indicate a policy of the UE, and the configuration information is used to indicate the UE to update the policy of the UE. The first network element 15 may be a UDR network element or an AMF network element. The policy information of the UE is used to indicate at least one of a URSP, an ANDSP, and a WLANSP of the UE.

For example, with reference to any one of FIG. 3 to FIG. 6, the first network element 15 may be the first network element in any one of FIG. 3 to FIG. 6. The PCF network element may be the PCF network element in any one of FIG. 3 to FIG. 6. The sending unit 1501 may be configured to perform a sending step in S101.

For example, with reference to FIG. 7, the first network element 15 may be the UDR network element in FIG. 7, and the PCF network element may be the PCF network element in FIG. 7. The sending unit 1501 may be configured to perform a sending step in S509.

For example, with reference to FIG. 8, the first network element 15 may be the UDR network element in FIG. 8, and the PCF network element may be the target PCF network element in FIG. 8. The sending unit 1501 may be configured to perform a sending step in S607.

For example, with reference to FIG. 9, the first network element 15 may be the new AMF network element in FIG. 9, and the PCF network element may be the PCF network element in FIG. 9. The sending unit 1501 may be configured to perform a sending step in S707.

For example, with reference to FIG. 10, the first network element 15 may be the new AMF network element in FIG. 10, and the PCF network element may be the target PCF network element in FIG. 10. The sending unit 1501 may be configured to perform a sending step in S805.

Optionally, the first network element 15 may further include a receiving unit 1502 and a processing unit 1503. The receiving unit 1502 is configured to receive update indication information sent by the PCF network element, where the update indication information includes at least one of the configuration information and a configuration information identifier, and the configuration information identifier is used to indicate the configuration information. The processing unit 1503 is configured to update the policy information of the UE based on the update indication information. For example, with reference to FIG. 4, the update indication information may be the first update indication information in FIG. 4, and the configuration information may be the first configuration information in FIG. 4. The receiving unit 1502 may be configured to perform a receiving step in S203. The processing unit 1503 may be configured to perform S204. For example, with reference to FIG. 5, the update indication information may be the second update indication information in FIG. 5, and the configuration information may be the second configuration information in FIG. 5. The receiving unit 1502 may be configured to perform a receiving step in S303. The processing unit 1503 may be configured to perform S304.

Optionally, the first network element 15 is a first AMF network element. The receiving unit 1502 is further configured to receive the policy information of the UE that is sent by a second AMF network element, where the second AMF network element is an AMF network element to which the UE connects before the UE connects to the first AMF network element. For example, with reference to FIG. 9, the first AMF network element may be a new AMF network element, and the second AMF network element may be an old AMF network element. The receiving unit 1502 may be configured to perform a receiving step in S705. For example, with reference to FIG. 10, the first AMF network element may be a target AMF network element, and the second AMF network element may be a source AMF network element. The receiving unit 1502 may be configured to perform a receiving step in S803.

Optionally, the receiving unit 1502 may be specifically configured to receive a first message sent by the second AMF network element, where the first message includes context information of the UE and the policy information of the UE. For example, with reference to FIG. 9, the first message may be a UE context transfer response message. For example, with reference to FIG. 10, in an implementation in which the context information of UE and the policy information of the UE in S803 are carried in a same message, the first message may be the message.

For a description of related content in this embodiment, refer to the foregoing method embodiments. Details are not described herein. In an example, with reference to the communications device in FIG. 2, the sending unit 1501 and the receiving unit 1502 may correspond to the communications interface 404 in FIG. 2, and the processing unit 1503 may correspond to the processor 401 or the processor 408 in FIG. 2.

Figure 16:
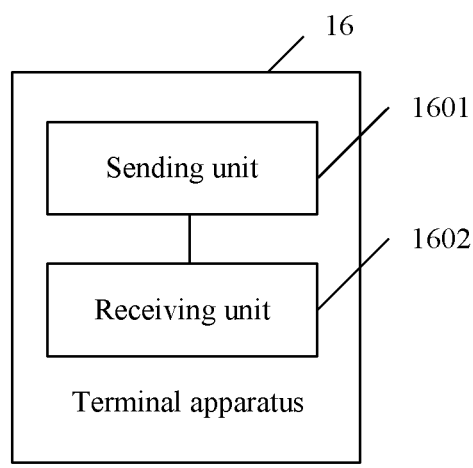
FIG. 16 is a schematic structural diagram of a terminal apparatus according to an embodiment of this application.

FIG. 16 is a schematic structural diagram of a terminal apparatus according to an embodiment of this application. The terminal apparatus 16 shown in FIG. 16 may be configured to perform a step performed by the UE in any method for configuring a policy for a terminal apparatus provided above. In addition, the terminal apparatus 16 may alternatively be a chip. The terminal apparatus 16 may include a sending unit 1601 and a receiving unit 1602. The sending unit 1601 is configured to send policy storage status information to a PCF network element, to indicate the PCF network element to send a PCF policy to the terminal apparatus when the policy storage status information indicates that the terminal apparatus does not store the PCF policy, where the policy storage status information is used to indicate whether the terminal apparatus stores the PCF policy. The receiving unit 1602 is configured to receive the PCF policy sent by the PCF network element. For example, with reference to FIG. 11, the sending unit 1601 may be configured to perform a sending step in S901. The receiving unit 1602 may be configured to perform a receiving step in S902.

Optionally, the sending unit 1601 may be specifically configured to send a registration request message to an AMF network element, where the registration request message carries the policy storage status information, the registration request message is used to indicate the AMF network element to send a policy control obtaining request message to the PCF network element, and the policy control obtaining request message carries the policy storage status information.

Optionally, the sending unit 1601 may be specifically configured to send the policy storage status information to the PCF network element after the receiving unit 1602 receives configuration information sent by the PCF network element, where the configuration information is configuration information sent by the PCF network element to the terminal apparatus based on at least policy information of the terminal apparatus, and the configuration information is used to indicate the terminal apparatus to update a policy of the terminal apparatus.

For a description of related content in this embodiment, refer to the foregoing method embodiments. Details are not described herein. In an example, with reference to the communications device in FIG. 2, the sending unit 1601 and the receiving unit 1602 may correspond to the communications interface 404 in FIG. 2.

Figure 17:
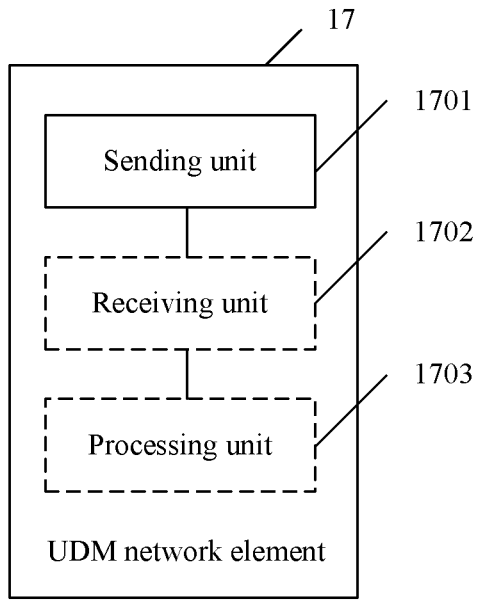
FIG. 17 is a schematic structural diagram of a UDM network element according to an embodiment of this application.

FIG. 17 is a schematic structural diagram of a UDM network element according to an embodiment of this application. The UDM network element 17 shown in FIG. 17 may be configured to perform a step performed by the UDM network element in any method for determining a PCF network element provided above. The UDM network element 17 may include a sending unit 1701. The sending unit 1701 is configured to send identification information of a first PCF network element to a first AMF network element, to indicate the first AMF network element to select the first PCF network element as a PCF network element that serves UE. The first PCF network element is an AMF network element selected by a second AMF network element to serve the UE. Optionally, the first AMF network element and the second AMF network element may be a same network element, or may be different network elements. For example, with reference to FIG. 13, the sending unit 1701 may be configured to perform a sending step in S1102.

In a possible design, the UDM network element may include a receiving unit 1702. The receiving unit 1702 is configured to receive a query request message sent by the first AMF network element. In this case, the sending unit 1701 may be specifically configured to send a query response message to the first AMF network element, and the query response message carries the identification information of the first PCF network element. For example, with reference to FIG. 13, the receiving unit 1702 may be configured to perform a receiving step in S1101.

In a possible design, the sending unit 1701 may be further configured to: after the receiving unit 1702 receives a query request message, send the query request message to the second AMF network element, to query the identification information of the first PCF network element. In this case, the receiving unit 1702 may be further configured to receive the identification information of the first PCF network element that is sent by the second AMF network element.

In a possible design, the UDM network element may store identification information of a PCF network element selected by an AMF network element to serve the UE. The AMF network element may report the selected PCF network element to the UDM after executing a PCF network element selection procedure. In this case, after receiving a query request message, the UDM network element may query locally stored information, to send an identifier information of the first PCF network element to the first AMF network element. Based on this, optionally, the receiving unit 1702 may be further configured to receive identification information of a second PCF network element, and the second PCF network element is a PCF network element reselected by the first AMF network element to serve the UE. The UDM network element 17 may further include a processing unit 1703, configured to update the identification information of the PCF network element selected by the first AMF network element to serve the UE from the identification information of the first PCF network element to the identification information of the second PCF network element. For example, with reference to FIG. 13, the receiving unit 1702 may be configured to perform a receiving step in S1105. The processing unit 1703 may be configured to perform S1106.

For a description of related content in this embodiment, refer to the foregoing method embodiments. Details are not described herein. In an example, with reference to the communications device in FIG. 2, the sending unit 1701 and the receiving unit 1702 may correspond to the communications interface 404 in FIG. 2. The processing unit 1703 may correspond to the processor 401 or the processor 408 in FIG. 2.

Figure 18:
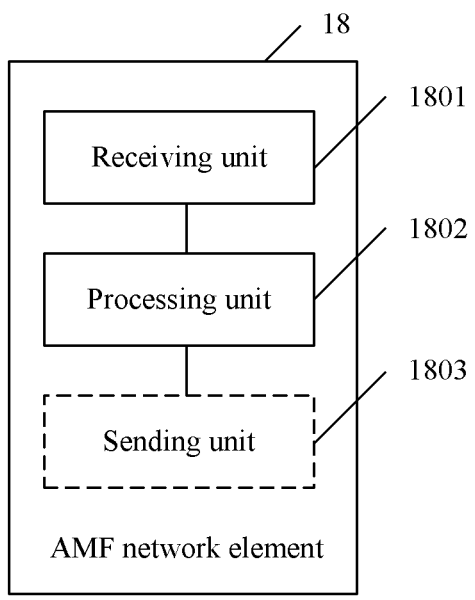
FIG. 18 is a schematic structural diagram of an AMF network element according to an embodiment of this application.

FIG. 18 is a schematic structural diagram of an AMF network element according to an embodiment of this application. The AMF network element 18 shown in FIG. 18 may be configured to perform a step performed by the first AMF network element in any method for determining a PCF network element provided above. The AMF network element 18 may include a receiving unit 1801 and a processing unit 1802. The receiving unit 1801 may be configured to receive identification information of a first PCF network element that is sent by a UDM network element, and the first PCF network element is an AMF network element selected by a second AMF network element to serve the UE. Optionally, the AMF network element 18 and the second AMF network element may be a same network element, or may be different network elements. The processing unit 1802 may be configured to select the first PCF network element as a PCF network element that serves the UE. For example, with reference to FIG. 13, the receiving unit 1801 may be configured to perform a receiving step in S1102. The processing unit 1802 may be configured to perform S1103.

In a possible design, the AMF network element 18 may further include a sending unit 1803, configured to send a query request message to the UDM network element, where the query request message is used to request the identification information of the first PCF network element. In this case, the receiving unit 1801 may be specifically configured to receive a query response message sent by the UDM network element, where the query response message carries the identification information of the first PCF network element. For example, with reference to FIG. 13, the sending unit 1803 may be configured to perform a sending step in S1101.

In a possible design, the processing unit 1802 may be further configured to reselect a second PCF network element to serve the UE. The sending unit 1803 may be further configured to send identification information of the second PCF network element to the UDM network element, to indicate the UDM network element to update the PCF network element selected by the AMF network element 18 to serve the UE. For example, with reference to FIG. 13, the processing unit 1802 may be configured to perform S1104. The sending unit 1803 may be configured to perform a sending step in S1105.

All the apparatuses (for example, the PCF network element 14, the first network element 15, the UE 16, the UDM network element 17, or the AMF network element 18) provided in the embodiments of this application may be configured to perform the corresponding methods. Therefore, for technical effects that can be achieved by the apparatuses, refer to the foregoing method embodiments. Details are not described herein in this embodiment of this application.

An embodiment of this application further provides a system for configuring a policy for UE. The system may include a first network element, a PCF network element, and the UE. The first network element is configured to send policy information of the UE to the PCF network element, where the policy information of the UE is used to indicate a policy of the UE. The PCF network element is configured to receive the policy information of the UE, and send configuration information to the UE based on at least the policy information of the UE, where the configuration information is used to indicate the UE to update the policy of the UE. The UE is configured to receive the configuration information, and update the policy of the UE based on the configuration information.

In a possible design, that the PCF network element is configured to send configuration information to the UE based on the policy information of the UE may include: If the configuration information includes first configuration information, the PCF network element is configured to send the first configuration information to the UE, where the first configuration information is used to indicate a first policy of the UE, and the policy indicated in the policy information of the UE does not include the first policy.

In a possible design, that the PCF network element is configured to send configuration information to the UE based on the policy information of the UE may include: If the configuration information includes second configuration information, the PCF network element is configured to send the second configuration information to the UE, where the second configuration information is used to indicate the UE to delete a second policy, and the policy indicated in the policy information of the UE includes the second policy.

In a possible design, that the PCF network element is configured to send configuration information to the UE based on the policy information of the UE may include: If the configuration information includes third configuration information, the PCF network element is configured to send the third configuration information to the UE, where the third configuration information is used to indicate the UE to update a third policy, and the policy indicated in the policy information of the UE includes the third policy.

In a possible design, the PCF network element may be further configured to send update indication information to the first network element, where the update indication information includes at least one of the configuration information and a configuration information identifier, and the configuration information identifier is used to indicate the configuration information. In this case, the first network element may be further configured to receive the update indication information, and update the policy information of the UE based on the update indication information.

In a possible design, the UE may be further configured to send policy storage status information to the PCF network element, where the policy storage status information is used to indicate whether the UE stores a PCF policy. The PCF network element may be further configured to receive the policy storage status information, and send the PCF policy to the UE if the policy storage status information indicates that the UE does not store the PCF policy. In this case, the UE may be further configured to receive the PCF policy.

In a possible design, that the UE may be further configured to send policy storage status information to the PCF network element may specifically include: The UE may be further configured to send a registration request message to an AMF network element, where the registration request message carries the policy storage status information; and the AMF network element is configured to receive the registration request message, and send a policy control obtaining request message to the PCF network element, and the policy control obtaining request message carries the policy storage status information.

In a possible design, that the UE may be further configured to send policy storage status information to the PCF network element may include: The UE may be further configured to send the policy storage status information to the PCF network element after receiving the configuration information sent by the PCF network element.

In a possible design, the first network element is a first AMF network element, the system may further include a second AMF network element, and the second AMF network element is an AMF network element to which the UE connects before the UE connects to the first AMF network element. The second AMF network element is configured to send the policy information of the UE to the first AMF network element. In this case, the first AMF network element may be further configured to receive the policy information of the UE.

In a possible design, that the second AMF network element is configured to send the policy information of the UE to the first AMF network element includes: The second AMF network element is configured to send a first message to the first AMF network element, where the first message includes context information of the UE and the policy information of the UE.

For a description of related content of the system for configuring a policy for UE provided in this embodiment of this application and technical effects that can be achieved by the system, refer to the foregoing method embodiments. Details are not described herein.

An embodiment of this application further provides a system for determining a PCF network element. The system may include a UDM network element, a first AMF network element, and a second AMF network element. The UDM network element is configured to send identification information of a first PCF network element to the first AMF network element. The first AMF network element is configured to receive the identification information of the first PCF network element that is sent by the UDM network element, and select the first PCF network element as a PCF network element that serves UE. The first PCF network element is an AMF network element selected by the second AMF network element to serve the UE. Optionally, the first AMF network element and the second AMF network element may be a same network element, or may be different network elements.

In a possible design, the first AMF network element may be further configured to send a query request message to the UDM network element, where the query request message is used to request the identification information of the first PCF network element. In this case, that the UDM network element is configured to send identification information of a first PCF network element to the first AMF network element may specifically include: The UDM network element is configured to send a query response message to the first AMF network element, where the query response message carries the identification information of the first PCF network element.

In a possible design, after receiving a query request message, the UDM network element sends the query request message to the second AMF network element, to query the identification information of the first PCF network element. The UDM network element receives the identification information of the first PCF network element that is sent by the second AMF network element.

In a possible design, the UDM network element may store identification information of a PCF network element selected by an AMF network element to serve the UE. The AMF network element may report the selected PCF network element to the UDM after executing a PCF network element selection procedure. In this case, after receiving a query request message, the UDM network element may query locally stored information, to send an identifier information of the first PCF network element to the first AMF network element. Based on this, optionally, the first AMF network element may be further configured to reselect a second PCF network element to serve the UE, and send identification information of the second PCF network element to the UDM network element. In this case, the UDM network element may be further configured to receive the identification information of the second PCF network element, and update the identification information of the PCF network element selected by the first AMF network element to serve the UE from the identification information of the first PCF network element to the identification information of the second PCF network element.

For a description of related content of the system for determining a PCF network element provided in this embodiment of this application and technical effects that can be achieved by the system, refer to the foregoing method embodiments. Details are not described herein.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer indications. When a computer executable indication is loaded and executed on a computer, all or some of the procedures or functions according to the embodiments of this application are generated. The computer may be a general-purpose computer, a dedicated computer, a computer network, or other programmable apparatuses. The computer indications may be stored in a computer readable storage medium or may be transmitted from a computer readable storage medium to another computer readable storage medium. For example, the computer indications may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center that integrates one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, apparently, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Apparently, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for configuring a policy for user equipment (UE), comprising:
    sending, by a unified data repository network element, policy information of the UE to a policy control function network apparatus, the policy information indicating a policy currently configured for the UE;
    sending, by the policy control function network apparatus, configuration information to the UE based on the policy information of the UE, wherein the configuration information instructs the UE to update a policy of the UE; and
    sending, by the policy control function network apparatus, update information to the unified data repository network element, wherein the update information comprises the configuration information.

2. The method according to claim 1, wherein the policy comprises a user equipment route selection policy (URSP), an access network discovery and selection policy (ANDSP), or a wireless local area network selection policy (WLANSP).

3. The method according to claim 1, further comprising:
receiving, by the policy control function network apparatus, policy storage status information from the UE, wherein the policy storage status information indicates whether the UE stores a policy control function policy; and
sending, by the policy control function network apparatus, the policy control function policy to the UE when the policy storage status information indicates that the UE does not store the policy control function policy.

4. The method according to claim 3, wherein the step of receiving policy storage status information from the UE comprises:
receiving, by the policy control function network apparatus, a policy control obtaining request message from a mobility management function network apparatus, the policy control obtaining request message carrying the policy storage status information.

5. A communications system for configuring a policy for user equipment (UE), the system comprising:
a unified data repository network element; and
a policy control function network apparatus;
wherein the unified data repository network element is configured to send policy information of the UE to the policy control function network apparatus, the policy information indicating a policy currently configured for the UE; and
the policy control function network apparatus is configured to:
receive the policy information of the UE from the unified data repository network element;
send configuration information to the UE based on the policy information of the UE, wherein the configuration information instructs the UE to update a policy of the UE; and
send update information to the unified data repository network element, wherein the update information comprises the configuration information.

6. The system according to claim 5, wherein the policy comprises a user equipment route selection policy (URSP), an access network discovery and selection policy (ANDSP), or a wireless local area network selection policy (WLANSP).

7. The system according to claim 5, wherein the policy control function network apparatus is further configured to:
receive policy storage status information from the UE, the policy storage status information indicating whether the UE stores a policy control function policy; and
send the policy control function policy to the UE when the policy storage status information indicates that the UE does not store the policy control function policy.

8. The system according to claim 7, wherein the policy control function network apparatus is further configured to receive from an mobility management function network apparatus a policy control obtaining request message carrying the policy storage status information from the UE.

9. The system according to claim 8, wherein the system further comprises the mobility management function network apparatus, and the mobility management function network apparatus is configured to send the policy control obtaining request message to the policy control function network apparatus after receiving a registration request message sent by the UE.

10. The method according to claim 1, wherein the step of sending configuration information to the UE comprises:
when the policy indicated in the policy information does not comprise a first policy of the UE, sending the configuration information to the UE, wherein the configuration information is for configuring the first policy for the UE; or
when the policy indicated in the policy information comprises a second policy of the UE, sending the configuration information to the UE, wherein the configuration information instructs the UE to delete the second policy; or
when the policy indicated in the policy information comprises a third policy, sending the configuration information to the UE, wherein the configuration information instructs the UE to update the third policy.

11. The method according to claim 1, further comprising:
receiving, by the UE, the configuration information from the policy control function network apparatus; and
updating, by the UE, the policy of the UE based on the configuration information.

12. The system according to claim 5, wherein the step of sending configuration information to the UE comprises:
when the policy indicated in the policy information does not comprise a first policy of the UE, sending the configuration information to the UE, wherein the configuration information is for configuring the first policy for the UE; or
when the policy indicated in the policy information comprises a second policy of the UE, sending the configuration information to the UE, wherein the configuration information instructs the UE to delete the second policy; or
when the policy indicated in the policy information comprises a third policy, sending the configuration information to the UE, wherein the configuration information instructs the UE to update the third policy.

13. The system according to claim 5, wherein the unified data repository network element is further configured to:
receive the update information from the policy control function network apparatus; and
update the policy of the UE based on the update information.

14. The system according to claim 5, further comprising the UE, wherein the UE is configured to:
receive the configuration information from the policy control function network apparatus; and
update the policy of the UE based on the configuration information.

15. A method for configuring a policy for user equipment (UE), comprising:
receiving, by a policy control function network apparatus, policy information of the UE from a unified data repository network element, the policy information indicating a policy currently configured for the UE;
sending, by the policy control function network apparatus, configuration information to the UE based on the policy information of the UE, wherein the configuration information instructs the UE to update a policy of the UE; and
sending, by the policy control function network apparatus, update information to the unified data repository network element, wherein the update information comprises the configuration information.

16. The method according to claim 15, wherein the policy comprises a user equipment route selection policy (URSP), an access network discovery and selection policy (ANDSP), or a wireless local area network selection policy (WLANSP).

17. The method according to claim 15, wherein the step of sending configuration information to the UE comprises:
when the policy indicated in the policy information does not comprise a first policy of the UE, sending the configuration information to the UE, wherein the configuration information is for configuring the first policy for the UE; or
when the policy indicated in the policy information comprises a second policy of the UE, sending the configuration information to the UE, wherein the configuration information instructs the UE to delete the second policy; or
when the policy indicated in the policy information comprises a third policy, sending the configuration information to the UE, wherein the configuration information instructs the UE to update the third policy.

18. The method according to claim 15, further comprising:
receiving, by the policy control function network apparatus, policy storage status information from the UE, wherein the policy storage status information indicates whether the UE stores a policy control function policy; and
sending, by the policy control function network apparatus, the policy control function policy to the UE when the policy storage status information indicates that the UE does not store the policy control function policy.

19. The method according to claim 18, wherein the step of receiving policy storage status information from the UE comprises:
receiving, by the policy control function network apparatus, a policy control obtaining request message from a mobility management function network apparatus, the policy control obtaining request message carrying the policy storage status information.

20. A policy control function network apparatus, comprising:
a processor; and
a non-transitory computer-readable storage medium storing a program to be executed by the processor, the program including instructions for:
receiving policy information of the UE from a unified data repository network element, the policy information indicating a policy currently configured for the UE;
sending configuration information to the UE based on the policy information of the UE, wherein the configuration information instructs the UE to update a policy of the UE; and
sending update information to the unified data repository network element, wherein the update information comprises the configuration information.

21. The policy control function network apparatus according to claim 20, wherein the policy comprises a user equipment route selection policy (URSP), an access network discovery and selection policy (ANDSP), or a wireless local area network selection policy (WLANSP).

22. The policy control function network apparatus according to claim 20, wherein the sending configuration information to the UE comprises:
when the policy indicated in the policy information does not comprise a first policy of the UE, sending the configuration information to the UE, wherein the configuration information is for configuring the first policy for the UE; or
when the policy indicated in the policy information comprises a second policy of the UE, sending the configuration information to the UE, wherein the configuration information instructs the UE to delete the second policy; or
when the policy indicated in the policy information comprises a third policy, sending the configuration information to the UE, wherein the configuration information instructs the UE to update the third policy.

23. The policy control function network apparatus according to claim 20, wherein the instructions further include instructions for:
receiving policy storage status information from the UE, wherein the policy storage status information indicates whether the UE stores a policy control function policy; and
sending the policy control function policy to the UE when the policy storage status information indicates that the UE does not store the policy control function policy.

* * * * *